US012608868B2

(12) United States Patent
Tongue

(10) Patent No.: US 12,608,868 B2
(45) Date of Patent: Apr. 21, 2026

(54) SYSTEMS AND METHODS FOR IMMERSIVE DIGITAL EXPERIENCES

(71) Applicant: SlingshotVR Inc., Sun Prairie, WI (US)

(72) Inventor: Scott M. Tongue, Wading River, NY (US)

(73) Assignee: SlingshotVR Inc., Sun Prairie, WI (US)

( * ) Notice: Subject to any disclaimer, the term of this patent is extended or adjusted under 35 U.S.C. 154(b) by 179 days.

(21) Appl. No.: 18/524,880

(22) Filed: Nov. 30, 2023

(65) Prior Publication Data

US 2024/0185496 A1 Jun. 6, 2024

Related U.S. Application Data

(60) Provisional application No. 63/583,772, filed on Sep. 19, 2023, provisional application No. 63/429,494, filed on Dec. 1, 2022.

(51) Int. Cl.
*G06T 13/40* (2011.01)
*G06T 17/20* (2006.01)

(52) U.S. Cl.
CPC .............. *G06T 13/40* (2013.01); *G06T 17/20* (2013.01)

(58) Field of Classification Search
CPC ................................ G06T 13/40; G06T 17/20
See application file for complete search history.

(56) References Cited

U.S. PATENT DOCUMENTS

| | | | | |
|---|---|---|---|---|
| 11,113,885 B1 * | 9/2021 | Cordes | .................. | A63F 13/213 |
| 2006/0228101 A1 * | 10/2006 | Sullivan | .................... | G06T 7/70 |
| | | | | 396/153 |

| | | | | |
|---|---|---|---|---|
| 2006/0287025 A1 * | 12/2006 | French | .................. | A63F 13/843 |
| | | | | 463/4 |
| 2010/0176952 A1 * | 7/2010 | Bajcsy | ................. | A61B 5/6887 |
| | | | | 340/573.1 |
| 2014/0071127 A1 * | 3/2014 | Shuster | ................. | A63F 13/358 |
| | | | | 345/420 |
| 2016/0267699 A1 * | 9/2016 | Borke | ..................... | G06F 3/017 |

(Continued)

OTHER PUBLICATIONS

Taylor II et al., "VRPN: A Device-Independent, Network-Transparent VR Peripheral System," VRST 2001. (Year: 2001).*

(Continued)

*Primary Examiner* — Daniel F Hajnik
*Assistant Examiner* — Adeel Bashir
(74) *Attorney, Agent, or Firm* — Quarles & Brady LLP

(57) ABSTRACT

A method for providing an immersive digital experience can include generating, at a first computing device, a virtual environment, the virtual environment including positional data for at least one digital object. The first computing device can receive first streamed motion data corresponding to real-time motion of a first physical subject and including a first plurality of data points, each data point of the first plurality of data points being associated with a position of a portion of the first physical subject. Within the virtual environment, a first skeletal mesh can be generated and positioned at a first initial position relative to the at least one digital object. Each of the first plurality of data points can be associated with a corresponding point along the skeletal mesh. Positional information of the first skeletal mesh and the at least one digital object can be streamed to a client device.

25 Claims, 11 Drawing Sheets

(56) References Cited

U.S. PATENT DOCUMENTS

| | | | |
|---|---|---|---|
| 2017/0230651 A1* | 8/2017 | Bose | .................. A63B 24/0003 |
| 2019/0266796 A1 | 8/2019 | Comer | |
| 2020/0368616 A1 | 11/2020 | Delamont | |

OTHER PUBLICATIONS

Ha et al., "Full-Body Motion Capture-Based Virtual Reality Multi-Remote Collaboration System," Applied Sciences, published Jun. 9, 2022. (Year: 2022).*

Jovanova, B. Virtual Human Representation, Adaptation, Delivery and Interoperability for Virtual Worlds, I' Universite d'Evry-Val d'Essonne, Institut National des Telecommunications, Doctoral Dissertation. Jun. 26, 2012 [retrieved on Jan. 30, 2024.] Retrieved from the Internet <https://theses.hal.science/tel-00712173/document>.

Nusman, D. Real-Time Full-Body Motion Capture in Virtual Worlds. University of Twente, Enschede, Netherlands. Master's Thesis. Jun. 28, 2006 [retrieved on Jan. 30, 2024.] Retrieved from the Internet <https://essay.utwente.nl/57579/1/scriptie_Nusman.pdf>.

Huynh, D. D. H. Development of a Standardized Framework for Cost-Effective Communication System Based on 3D Data Streaming and Real-Time 3D Reconstruction. Texas A&M University,-Corpus Christi, Master's Thesis. May 31, 2017 [retrieved on Jan. 30, 2024.] Retrieved from the Internet <https://tamucc-ir.tdl.org/server/api/core/bitstreams/aa8bb888-9a6c-47be-a955 -4690c17b9c23/content>.

International Search Report and Written Opinion mailed Mar. 15, 2024 from PCT/US2023/81890, 14 pages.

* cited by examiner

400

402 ~ RECEIVE STREAMED MOTION DATA FROM MOTION DATA CAPTURE SYSTEM

404 ~ ASSIGN SKELETAL MESHES TO RECEIVED MOTION DATA

406 ~ SEND SKELETAL MESHES TO DOWNSTREAM SERVER

408 ~ COMPRESS MOTION DATA

410 ~ STREAM MOTION DATA TO DOWNSTREAM SERVER

412 ~ RECEIVE INPUTS FROM DOWNSTREAM SERVER

500

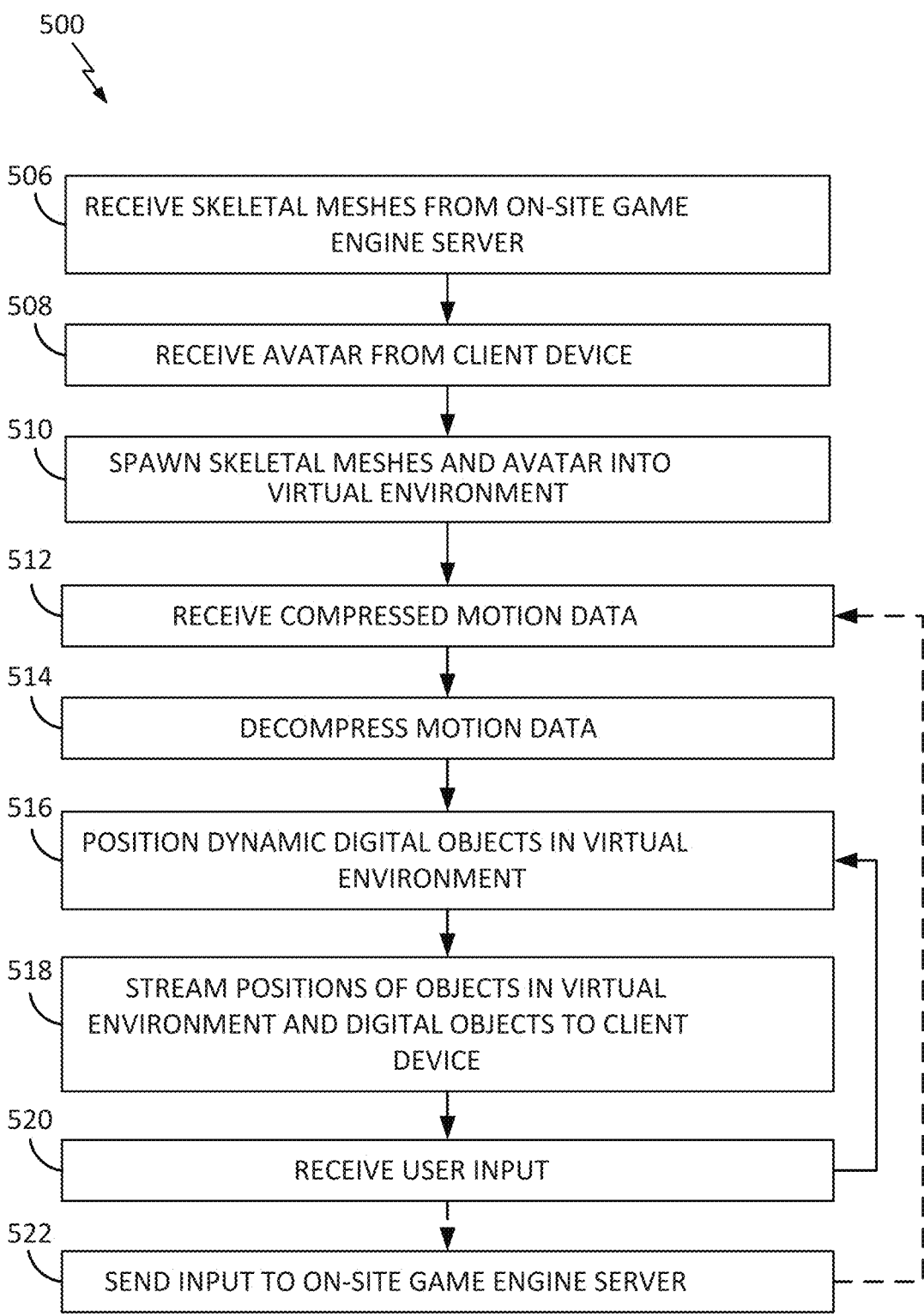

506 — RECEIVE SKELETAL MESHES FROM ON-SITE GAME ENGINE SERVER

508 — RECEIVE AVATAR FROM CLIENT DEVICE

510 — SPAWN SKELETAL MESHES AND AVATAR INTO VIRTUAL ENVIRONMENT

512 — RECEIVE COMPRESSED MOTION DATA

514 — DECOMPRESS MOTION DATA

516 — POSITION DYNAMIC DIGITAL OBJECTS IN VIRTUAL ENVIRONMENT

518 — STREAM POSITIONS OF OBJECTS IN VIRTUAL ENVIRONMENT AND DIGITAL OBJECTS TO CLIENT DEVICE

520 — RECEIVE USER INPUT

522 — SEND INPUT TO ON-SITE GAME ENGINE SERVER

CONNECT TO GAME ENGINE SERVER

604

GENERATE OR RETRIEVE DIGITAL OBJECTS AND
SPAWN TO GAME HOSTING PLATFORM

606

RECEIVE POSITIONAL DATA OF DIGITAL OBJECT OF
VIRTUAL ENVIRONMENT

608

RENDER VIRTUAL ENVIRONMENT AND DIGITAL
OBJECTS

610

DISPLAY VIRTUAL ENVIRONMENT AND DIGITAL
OBJECTS

612

RECEIVE USER INPUT

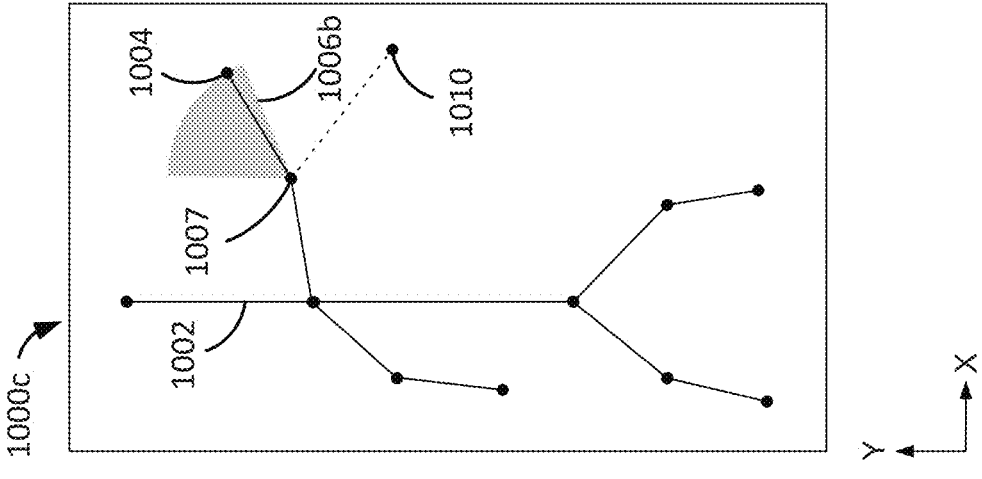
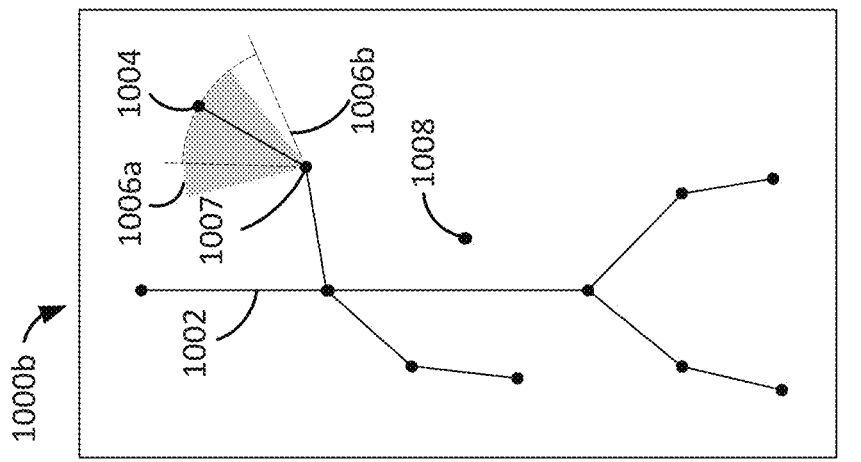
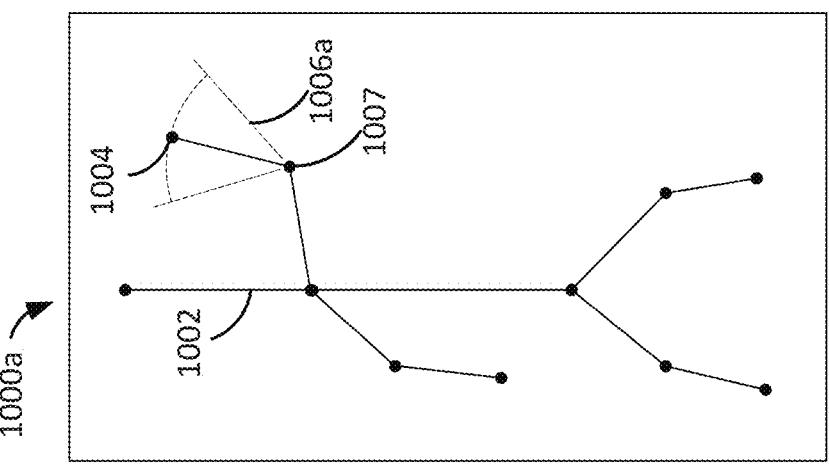
FIG. 10

SYSTEMS AND METHODS FOR IMMERSIVE DIGITAL EXPERIENCES

CROSS-REFERENCE TO RELATED APPLICATIONS

This application claims priority to U.S. Provisional Patent Application No. 63/429,494 filed Dec. 1, 2022, and U.S. Provisional Patent Application No. 63/583,772 filed Sep. 19, 2023, the entirety of which are incorporated herein by reference.

BACKGROUND

Virtual environments, including, for example video games and virtual reality environments can include dynamic three-dimensional representations of people, animals, machines, etc. In some contexts, it can be useful for three-dimensional objects in a virtual environment to be responsive to movements in a physical environment.

SUMMARY

In accordance with some embodiments of the disclosed subject matter, systems and methods for immersive digital experiences are provided.

In accordance with some embodiments of the disclosed subject matter, a method for providing an immersive digital experience can be provided. The method can include generating, at a first computing device, a virtual environment, the virtual environment including positional data for at least one digital object. First streamed motion data can be received, the first streamed motion data corresponding to real-time motion of a first physical subject and including a first plurality of data points, each data point of the first plurality of data points being associated with a position of a portion of the first physical subject. Within the virtual environment, a first skeletal mesh can be generated and positioned at a first initial position relative to the at least one digital object. Each of the first plurality of data points can be associated with a corresponding point along the skeletal mesh. Positional information of the first skeletal mesh and the at least one digital object can be streamed to a client device.

In some embodiments, the method further includes: receiving second streamed motion data, the second streamed motion data corresponding to motion of a second physical subject and including a second plurality of data points, each data point of the second plurality of data points being associated with a position of a portion of the second physical subject; generating, within the virtual environment, a second skeletal mesh and positioning the second skeletal mesh at a second initial position relative to the at least one digital object; associating each of the second plurality of data points with a corresponding point along the second skeletal mesh; and streaming, to the client device, positional information of the second skeletal mesh.

In some embodiments, the first streamed motion data is received from a first server, and the second streamed motion data is received from a second server.

In some embodiments, the method further comprises: generating, within the virtual environment, a digital avatar, the digital avatar corresponding to a user of the virtual environment; receiving, from the client device, an instruction, the instruction corresponding to a movement of the digital avatar within the virtual environment; in response to the instruction, moving the digital avatar within the virtual environment; and streaming, to the client device, positional information of the digital avatar.

In some embodiments, the streamed data is compressed, and the method further comprises decompressing the streamed data.

In some embodiments, decompressing the streamed data includes inferring from the first plurality of data points, an inferred data point, a position of the inferred data point being calculated relative to at least one data point of the first plurality of data points.

In some embodiments, the first streamed motion data can include a first positional coordinate, and the method can further include determining that the first positional coordinate does not correspond to a portion of the first physical subject and excluding the first positional coordinate from the positional information streamed to the client device.

In some embodiments the method can further include determining that the first positional coordinate does not correspond to a position of a corresponding portion of the first physical subject, generating an updated first positional coordinate corresponding to a predicted position of the corresponding portion of the first physical subject, and associating the updated first positional coordinate with a corresponding point along the skeletal mesh. In some cases, determining that the first positional coordinate does not correspond to a position of a corresponding portion of the first subject can include determining that the first positional coordinate is located outside of a first range of possible positions of the corresponding portion of the first subject. In some examples, the updated first positional coordinate is generated using an inverse kinematics algorithm. In some examples the inverse kinematics algorithm is one of a cyclic coordinate descent inverse kinematic (CCDIK) algorithm and a forward and backward reaching inverse kinematic (FABRIK) algorithm. In some examples, the updated first positional coordinate is generated in real-time.

In some embodiments, the method further comprises receiving positional data of a user within the virtual environment, wherein the first plurality of data points is determined based at least in part on the positional data of the user.

In some embodiments the method can include determining, based at least in part on a computational or networking constraint, a resolution of the first skeletal mesh, and selecting, from the first streamed motion data the first plurality of data points, the first plurality of data points including fewer data points than the first streamed motion data.

In some embodiments each of the first plurality of data points includes at least a portion of a unit quaternion. In some examples, the method further comprises determining, for each of the first plurality of data points, determining, based on the corresponding portion of the unit quaternion, a complete unit quaternion. In some examples, associating each of the first plurality of data points with a corresponding point along the skeletal mesh includes multiplying the complete unit quaternion of at least one of the first plurality of data points by a scale value associated with a dimension of the first subject. In some examples, the first plurality of data points includes a first data point and a second data point, wherein a value of the second data point indicates a position of a second portion of the first subject relative to a position of a first portion of the first subject corresponding to the first data point.

In accordance with some embodiments of the disclosed subject matter, a computer system can be provided. The computer system can include at least one memory; and at least one processor coupled to the at least one memory. The system can be configured to cause the at least one processor to execute instructions stored in the at least one memory to: generate, a virtual environment, the virtual environment including positional data for at least one digital object; receive, from a first device, first streamed motion data, the first streamed motion data corresponding to real-time motion of a first physical subject and including a first plurality of data points, each data point of the first plurality of data points being associated with a position of a portion of the first physical subject; receive, from a second device, second streamed motion data, the second streamed motion data corresponding to real-time motion of a second physical subject and including a second plurality of data points, each data point of the second plurality of data points being associated with a position of a portion of the second physical subject; generate, within the virtual environment, a first skeletal mesh and a second skeletal mesh; position the first skeletal mesh at a first initial position relative to the at least one digital object; position the second skeletal mesh at a second initial position relative to the at least one digital object; associate each of the first plurality of data points with a corresponding point along the first skeletal mesh; associate each of the second plurality of data points with a corresponding point along the second skeletal mesh; and stream, in real time, to a client device, positional information of the first skeletal mesh, the second skeletal mesh, and the at least one digital object.

In accordance with some embodiments of the disclosed subject matter, a non-transitory computer readable medium can be provided. The non-transitory computer readable medium can include instructions to cause at least one processor on a computer to: generate, a virtual environment, the virtual environment including positional data for at least one digital object; receive, from a first device, first streamed motion data, the first streamed motion data corresponding to real-time motion of a first physical subject and including a first plurality of data points, each data point of the first plurality of data points being associated with a position of a portion of the first physical subject; receive, from a second device, second streamed motion data, the second streamed motion data corresponding to real-time motion of a second physical subject and including a second plurality of data points, each data point of the second plurality of data points being associated with a position of a portion of the second physical subject; generate, within the virtual environment, a first skeletal mesh and a second skeletal mesh; position the first skeletal mesh at a first initial position relative to the at least one digital object; position the second skeletal mesh at a second initial position relative to the at least one digital object; associate each of the first plurality of data points with a corresponding point along the first skeletal mesh; associate each of the second plurality of data points with a corresponding point along the second skeletal mesh; and stream, in real time, to a client device, positional information of the first skeletal mesh, the second skeletal mesh, and the at least one digital object.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 5 is a flowchart showing an example process that can be performed by a remote game engine server to provide a streamed immersive digital experience to users, according to some embodiments;

FIG. 10 is a schematic representation of consecutive frames of positional data illustrating aspects of a dynamic correction system.

DETAILED DESCRIPTION

Figure 1:
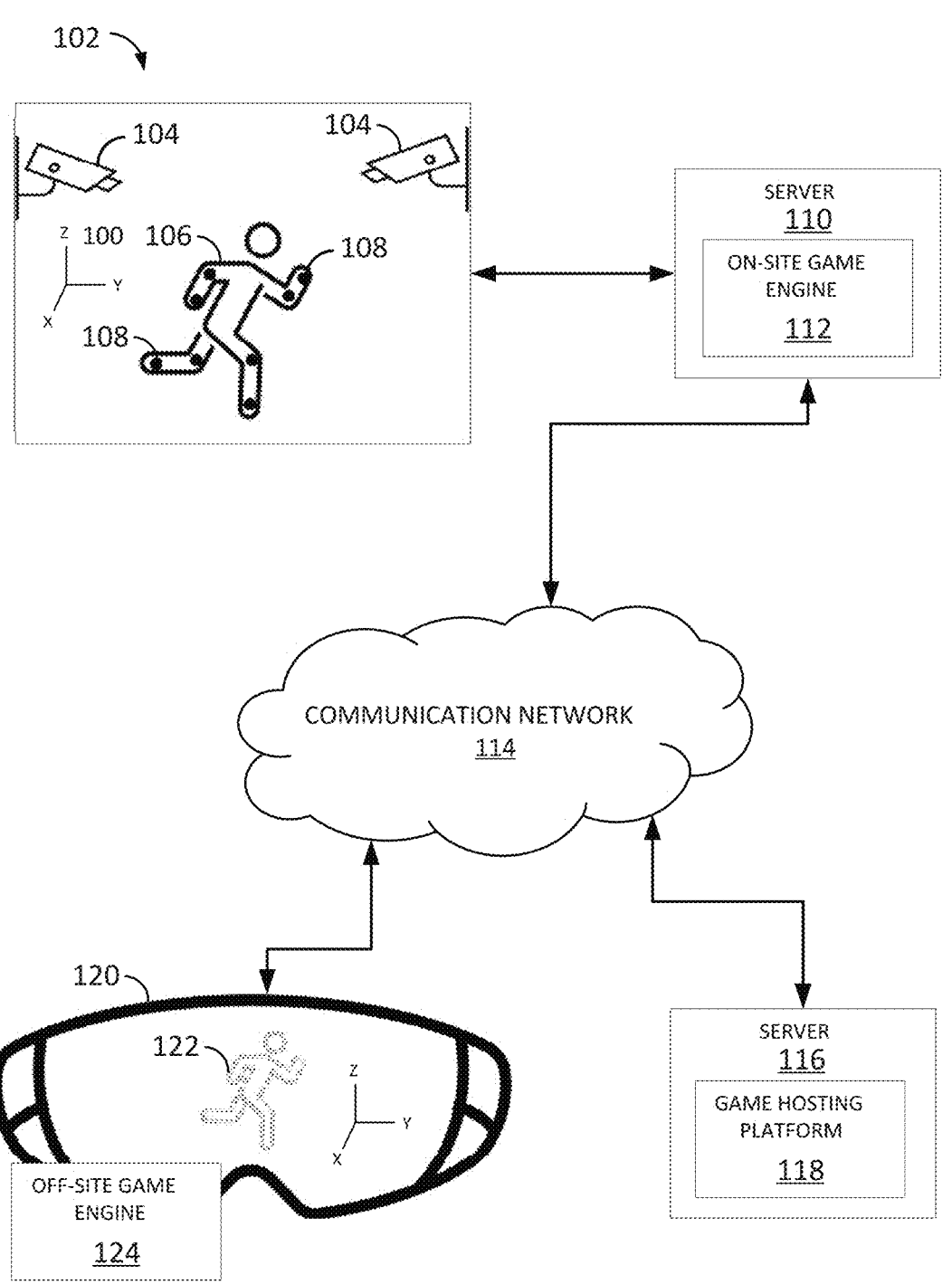
FIG. 1 is an example schematic representation of a system for providing immersive digital experiences using streamed positional data, according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon)

and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, the terms "about," "substantially," and "approximately" refer to a range of values ±5% of the numeric value that the term precedes. As a default the terms "about" and "approximately" are inclusive to the endpoints of the relevant range, but disclosure of ranges exclusive to the endpoints is also intended. The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, "real-time" refers to processing and providing information within a time interval brief enough to not be discernable by a user. For example, real-time can include a time period within 100 ms, within 200 ms, within 300 ms, within 400 ms, or within 500 ms of an event. "Near real-time" refers to processing and providing information in parallel with capture of the information but can include a latency of greater than ±5% of real-time processing (e.g., a lag may be perceptible to a user relative to the occurrence of the event). Additionally, as used herein, "at least one processor" being described as performing one or more functions refers to: one processor performing the one or more functions, multiple processors performing the one or more functions where one processor performs some functions and one or more other processors perform other functions, multiple processors performing the one or more functions where at least some of the multiple processors work together to perform one or more functions (e.g., may include a first processor and a second processor that together to perform a single recited function), or a combination thereof. In other words, as used herein, "at least one processor" performing one or more functions does not necessarily require a single processor performing each of the listed functions. Motion capture systems can be used to gather motion data of a subject and render the data in a digital environment (e.g., a three-dimensional environment, a two-dimensional projection of capture motion data, etc.). In some cases, for example, motion capture systems include one or more cameras to detect motion of a subject. In some cases, motion data is captured and recorded to provide realistic gaming experiences (e.g., a football player can be recorded performing various maneuvers, and motion of the player can be replicated in a digital game by a three-dimensional skeleton or digital character). In order to capture three-dimensional motion data, motion capture systems can identify points along a subject's body, and track the movement of those points, including, in some cases, coordinates of the points in a three-dimensional coordinate system, and rotational values associated with the points. The points which are to be identified by the motion capture system can be designated manually in some cases. For instance, markers can be placed on a subject's body at points along the body that can provide useful information to the motion capture system about a particular joint, bone, or any other part of the subject. The markers can be visually identifiable by the motion capture system and can allow the motion capture system to reconstruct the movement of the subject by capturing and recording positional and rotational coordinates for each point. The positional and rotational values can be used to render a scene (e.g., a two-dimensional ("2D") scene, a three-dimensional ("3D") scene, an extended reality scene, etc.) in which the motion data captured by the motion capture system is used to control movements of a model (e.g., based on a 3D skeleton) in the scene. For example, markers can be positioned at various points on an athlete's body (e.g., elbows, knees, wrists, ankles, etc.) to allow the motion capture system to capture motion data about joints, of the athlete, and markers can further be provided at appendages (e.g., hands and feet) and other bones or features of the athlete to provide additional movement information of the user. Motion data can be captured based on the movement information received by the motion capture system based on a visual identification of the marks in one or more frames of captured image data. In some cases, the use of a greater number of markers can provide for capture of more precise motion data of the subject, which can, in turn, produce more realistic movement in a three-dimensional skeleton or mesh replicating the motions of the subject. In some examples, any suitable motion capture system or combination of motion capture systems can be used in connection mechanisms described herein, such as sonar-based motion capture systems, optical-based motion capture systems, tag and/or marker-based motion capture systems, computer vision-based motion capture systems, inertial measurement unit-based motion capture systems, etc. As a more particular example, a motion capture system(s) can use any combination of sensors and components of commercially available motion capture systems, such as OptiTrack motion capture systems available from NaturalPoint headquartered in Corvallis Oregon, motion capture systems available from Vicon Motion Systems Ltd headquartered in Oxford, United Kingdom, motion capture systems available from Qualisys AB headquartered in Goteborg, Sweden, motion capture systems available from Xsens headquartered in Enshede, Netherlands, motion capture systems available from Kinexon headquartered in Munich Germany, motion capture systems available from available from Move.AI headquartered in London, United Kingdom.

In some motion capture systems, motion data can be generated without use of visual markers (or based on fewer visual markers). For example, some motion capture systems can use machine learning to translate two-dimensional image or video capture from cameras into three-dimensional models of motions of a subject. For example, the subject can be a runner, and a machine learning model can be trained to identify body parts of the runner from images (e.g., images in frames of a video). The model can associate identified body parts (e.g., a knee, a hand, a neck, an elbow, a heel, etc.) with coordinates (e.g., positional, and rotational values), and can further associate those coordinates with a three-dimensional skeleton, which can have portions corresponding to the identified body parts of the athlete. The portions of the skeleton can thus move to approximate or replicate captured movements of the athlete. In some cases, a machine learning model can identify different numbers of body parts, and thus collect different numbers of coordinates for the body parts, which can result in greater accuracy and motional integrity the greater number of coordinates are produced. However, the tracking or identification of more body parts can also be associated with a cost in computing resources, and can correspondingly be associated with slower rendering speed, which can negatively impact viewing of the data in a three-dimensional viewing environment.

In some embodiments, motion capture systems and streaming systems can include a server that can be positioned relatively near visual motion capture elements (e.g., cameras), which can allow for relatively faster rendering of three-dimensional models or skeletons associated with motion data captured by the visual motion capture elements. For example, the server can be "on-site" (e.g., within the same building, campus, or complex as cameras of a motion capture system, connected to the motion capture systems via a wired or wireless local area network (LAN), etc.) as can advantageously minimize a network latency between the server and the motion capture systems. The server can include (e.g., can host or execute) a game engine to facilitate processing and rendering of the digital bodies based on skeletons associated with motion data captured from the physical subjects. In some systems, a 2D video of the digital bodies can be rendered on-site and streamed to off-site clients, so that users of the systems can view digital renderings of physical movements of a subject in real-time. Digital meshes associated with the digital bodies and associated motions can include large amounts of data and can thus require significant amounts of network bandwidth and processing power to consume as a stream, which can lead to lags in streaming and loss of quality of the streamed data. Further, streaming using such techniques can limit usefulness of the streamed data, as it can inhibit immersive interaction with the streamed three-dimensional data.

In some embodiments, mechanisms described herein can provide improved systems and method for streaming motion data of dynamic subjects (e.g., humans, horses, dogs, cars, sport equipment such as bats, balls, clubs, tennis rackets, or any other moving subject). The motion data can include positional and rotational values for one or more points of a subject's body, and motion by the subject can be mapped to and replicated by a digital structure (e.g., a mesh, a skeleton, and/or any other suitable digital representation of the subject). The motion can be reproduced in real-time, substantially in real-time, or near real-time in a three-dimensional environment (e.g., in an extended reality scene, such as a virtual reality scene, a mixed reality scene, etc.), which can allow a user to immersively experience the movement (e.g., to provide an immersive digital experience). As an example, in some embodiments, motion data of football players can be captured and streamed to a game engine, which can render the motion of each player in real-time to a user, allowing the user to immersively experience the football game in a three-dimensional environment. The user can experience the real-time three-dimensional motion stream using any suitable display device, such as a virtual reality or augmented reality headset, a projector, or a screen. Further the user can experience the real-time 3D motion streaming directly, (e.g., as if the user is positioned within the 3D environment), or indirectly, as, for example, the user views the 3D environment on a screen and an avatar of the user and/or a virtual camera representing a viewpoint of the user is positioned relative to the streamed motion. The improved systems and methods described herein can be used with motion streaming for any event, including any sports event, awards show, streamed live-audience shows, or any streamed event that can include motion capture and streaming of the motion data.

In some embodiments, mechanisms described herein can be used in various applications and in various industries. For example, mechanisms described herein can facilitate remote collaboration between multiple remote motion capture sites and can facilitate offsite real-time viewing of content based on the motion capture information from the multiple motion capture sites. As another example, mechanisms described herein can facilitate remote film production and direction by facilitating real-time three-dimensional viewing of a remote actor or actors' movements in a scene with other local or remote actors, thereby facilitating remote collaboration. As yet another example, mechanisms described herein can facilitate virtual, dynamic, and collaborative learning experiences (e.g., including real-time demonstrations and learning in medical and manufacturing settings). As still another example, mechanisms described herein can facilitate immersive viewing of live events, such as a sports, concerts, festivals, speaking events, etc. As a further example, mechanisms described herein can facilitate real-time or near real-time and high-fidelity e-sports gaming in which a user's body position is used as input to a game.

FIG. 1 illustrates an example system 100 for streaming motion capture data, according to some embodiments. As shown, the system 100 can include a motion capture system 102 configured to collect motion data of a subject. The motion capture system 102 can include detection devices 104, which, in FIG. 1 are cameras 104. In the illustrated embodiment, the cameras 104 collect motion data of an athlete 106. The motion data can include three-dimensional positional coordinates (e.g., along x, y, and z axes) and rotational coordinates (e.g., vectors relative to another point or an origin and/or radial values and angular offsets from linear axes) for points 108 along the athlete's body 106 (e.g., at joints, appendages, and/or any other point along the user's body). In some cases, the points 108 can be associated with markers placed at desired locations on the user's body, which can be sensed by the cameras 104 and used to construct a skeletal mesh as a digital representation of the athlete 106. In some cases, the motion capture system can identify points along the athlete's body for which to collect coordinate information and can associate the coordinates with a digital skeleton or skeletal mesh through the use of a machine learning model(s). In some embodiments, the detection devices can be any device(s) which are capable of collecting and/or deriving motion data of a subject, including, but not limited to, LiDAR scanners, radar scanners, wearable gyroscopes, global positioning system ("GPS") devices, local positioning system ("LPS") devices, wearable accelerometers, etc.

The motion capture system 102 can be operatively connected to (e.g., in networked communication with) an on-site server 110, which can be configured to process the motion capture data collected or generated by the motion capture system 102 and components thereof. In some embodiments, the motion capture system 102 and the on-site server 110 can be connected through any suitable communication network or combination of communication networks with acceptable latency (e.g., a local area network ("LAN"), such as a LAN implemented using a wireless access point and/or one or more wires). For example, system 102 and server 110 can be connected through a Wi-Fi network (which can include one or more wireless routers, one or more switches, etc.), a peer-to-peer network (e.g., a local peer-to-peer cellular network connection, such as a 5G sidelink connection, a peer-to-peer Wi-Fi connection, a Bluetooth network, etc.), a wired network (e.g., directly through ethernet or fiber cable) etc. In some embodiments, system 102 and server 110 can be connected by a local area network.

In some embodiments, the game engine 112 can comprise software and libraries on the server 110 which can process the motion data provided by motion data capture system 102. In some embodiments, the game engine 112 can receive coordinates provided by the motion capture system 102 and generate a 3D model which can substantially mimic the movements of a subject (e.g., the athlete 106). In some embodiments, the game engine can use a skeleton, which can be retrieved from a memory of the server hosting the game engine (e.g., memory 216 of server 110 shown in FIG. 2), and points of the motion capture data can be mapped to corresponding points along the skeleton. For example, the game engine 112 can include quadrupedal skeletons which can be used with quadrupedal subjects (e.g., horses, dogs, etc.), bipedal skeletons for use with bipedal subjects (e.g., humans), car skeletons for use with automotive subjects, etc. The game engine 112 can further include a physics module and machine learning (ML) functionality, which can be used to estimate unknown motion data of a subject. For example, if hip and knee motion is known, but foot motion is unknown, a physics engine can predict the motion of the foot based on the known hip and knee motion, and the predicted motion of the foot can be used to render foot motion. The game engine 112 can stream motion data of the three-dimensional models to other systems, servers, or clients. In some embodiments, however, as noted above, streaming high fidelity motion data about three-dimensional models can impose computational and network costs and can limit functionality of a game or virtual environment. According to some embodiments, the game engine can be configured to stream positional and rotational data associated with motion of the subject 106, including the positional and rotational coordinates, which can include significantly less data than three-dimensional models. The coordinates can be compressed according to known compression algorithms, and can be provided to systems and clients, which can, using the streamed positional data, reconstruct 3D models therefor and stream positional data for the 3D models.

In some embodiments, mechanisms described herein (e.g., implemented in the game engine 112) can implement lossy compression techniques (e.g., compression wherein data is omitted and not restored to its original form after decompression) instead of or in addition to lossless compression techniques. For example, mechanisms described herein can select data to send based on a volume of data and computational and networking constraints. For example, motion data can be captured for eight points 108 along an athlete's body 106, as shown, but in some cases, streaming coordinates for all eight points 108 can negatively impact a rendering speed for downstream systems and clients. In some embodiments, motion capture data can be captured for more than one subject, and an increased number of subjects can increase a volume of data to be streamed, which can further negatively impact a rendering speed for downstream systems and clients. In some embodiments, the game engine can choose a subset of the points 108 to send to downstream systems, which can facilitate streaming of motion data for consumption by the downstream systems. In some embodiments, motion capture data can be captured for up to 32 points along a subject's body, or for up to 64 points, or for up to 100 points, or for up to 200 points, or for up to 360 points, or for more than 360 points.

In some embodiments including as described above, the server 110 can communicate with servers or devices that are not on-site (e.g., devices not included in a LAN with the server 110, or otherwise positioned too far from the server 110 to be in a wired connection therewith, or communicate through Wi-Fi, peer-to-peer 5G networks etc.). As further illustrates, a network 114 can be provided, which can operatively connect the server 110 and downstream systems, which, as illustrated, can include a dedicated server 116 hosting a game hosting platform 118 (e.g., a game engine which can distribute motion data of various characters in the scene, perform synchronization, etc.), and a user (e.g., a client) device 120 hosting an off-site game engine 124. Downstream devices 116, 120 can consume data from the server 110, or otherwise communicate therewith using the communications network, 114, which, in some embodiments, can be a wide-area network ("WAN"), such as the Internet.

The server 116, in some embodiments, can be substantially similar to the server 110, and can provide similar capabilities. For example, as illustrated, the server 116 can host a game hosting platform 118, which can be similar to game engine 112. In some embodiments, the server 116 can consume positional data, including compressed motion data coordinates streamed by server 110 and associated game engine 112 over the communications network 114. At the game hosting platform 118, the compressed positional data can be decompressed, and assigned to skeletal meshes to produce a 3D model of the motion of the subject 106 (e.g., the athlete 106) at the server 116. In some cases, skeletal meshes and digital bodies are stored in a memory of server 116 and accessed by the game hosting platform 118 to associate with streamed positional information. In some embodiments, the server 116 can receive skeletal meshes to be associated with streamed positional data from server 110. For example, the game engine 112 can provide the skeletal meshes associated with certain streamed data upon a connection of the server 116 with the server 110, or upon request from the server 116 (e.g., through an application programming interface (API) call).

In some embodiments, the system 100 can further include a user device 120, which can allow a user to immersively experience the motion captured by motion capture system 102 in real-time and can further allow the user to experience the captured motion in three dimensions. In the illustrated embodiment, the user device 120 comprises virtual reality headset 120, which can be worn by the user to create an illusion that the user is positioned within the virtual environment. A user device, in some embodiments, can be a mixed reality headset, an augmented reality headset, any head-mounted display, a projector, a screen of a mobile device (e.g., a smartphone, a tablet computer, etc.), a computer monitor, a television screen, or any other device which can be used to display streamed content. The user device 120 can be connected to the communications network 114 and can thus be in communication with either or both of servers 110 and 116. In some embodiments the user device can stream the three-dimensional motion data (e.g., three-dimensional models performing the motion of subject 106), and can render and display a scene based on the data to the user. For example, the user device 120 can display a three-dimensional representation 122 of the subject 106 to the user. The user device 120 can stream three-dimensional data from either or both of servers 110 and 116. In some embodiments, an on-site server hosting an on-site game engine (e.g., server 110) can perform the same functions as a dedicated server with a game hosting platform (e.g., game hosting platform 118 shown in FIG. 1) and the user device can determine a proximity to the on-site server and the dedicated server, and can connect to the server most proximate the user to reduce latency and performance issues from streaming three-dimensional content from a distant server. In some embodiments, including as later described, a user may desire to experience motion data captured from multiple motion data capture systems, and can connect to a server (e.g., server 116), which aggregates motion data from multiple motion data captures systems. In some cases, a particular virtual reality experience or game can be hosted at a server, and the user can thus select that particular server from which to stream three-dimensional data.

Figure 2:
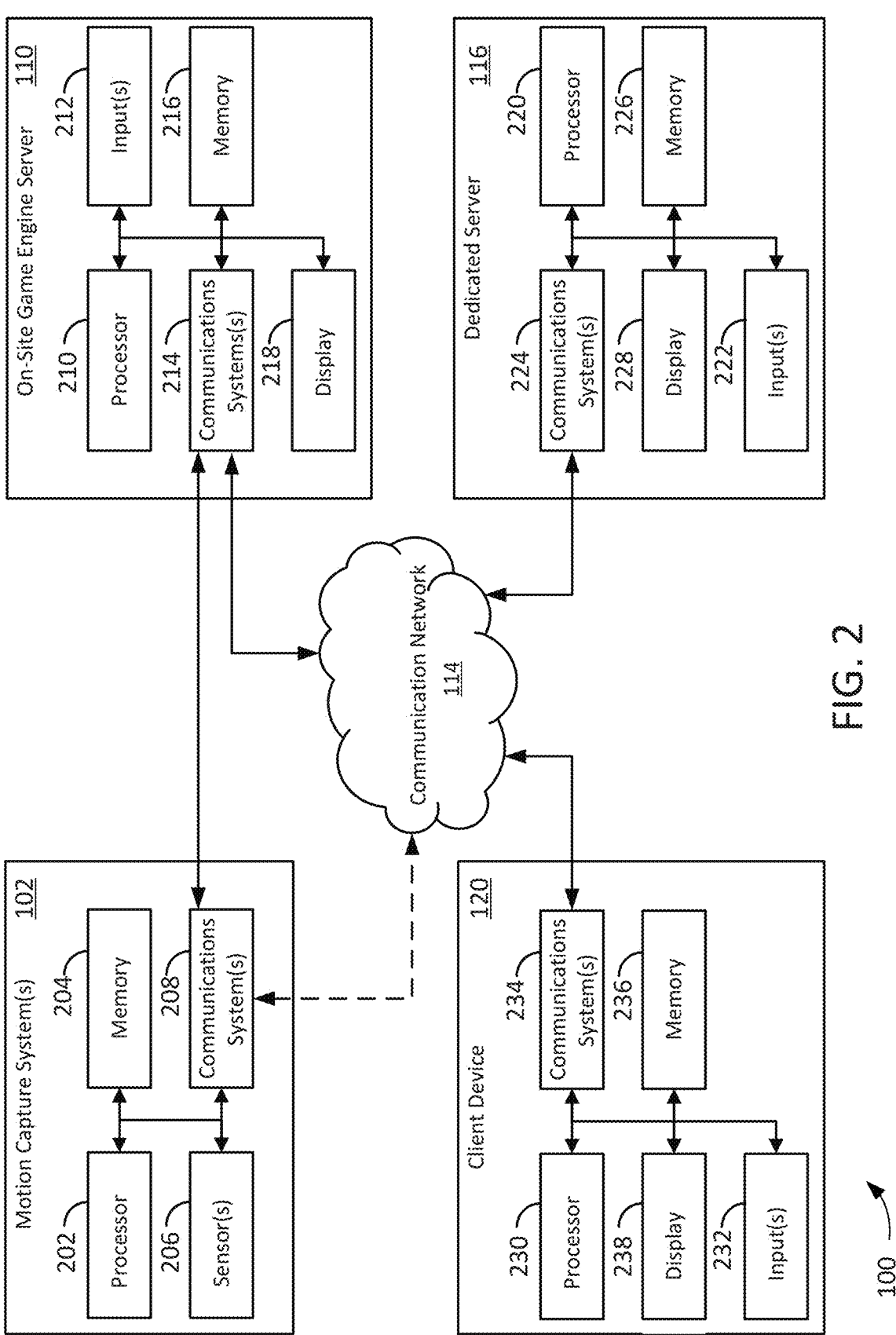
FIG. 2 is an example of hardware that can be used to implement a motion data capture system, an on-site game engine server, a remote game engine server, and a client device shown in FIG. 1 according to some embodiments.

FIG. 2 is a schematic diagram illustrating an example hardware configuration for system 100, including, as shown, the motion capture system 102, the on-site game engine server 110, the communication network 114, the remote game engine server 116, and the client device 120.

As further shown in FIG. 2, the motion capture system 102 can include a processor 202, memory 204, sensors 206 (e.g., cameras 104), and communications systems 208. The sensor(s) 206 can be any sensor or combination of sensors which can be configured to capture motion data, alone or in combination with data from other sensors, as described above. In some embodiments, processor 202 can be any suitable hardware processor or combination of processors, such as a central processing unit (CPU), a graphics processing unit (GPU), an accelerated processing unit (APU), an application specific integrated circuit (ASIC), a field-programmable gate array (FPGA), a combination thereof, etc.

In some embodiments, memory 204 can include any suitable storage device or devices that can be used to store instructions, values, configurations, etc., that can be used, for example, by processor 202 to process motion data from sensors. For example, memory 204 can include software which can be used by operators to configure the motion data capture system, ML models for processing images obtained by sensors 206 and calculating coordinates therefrom, etc. Memory 204 can include any suitable volatile memory, non-volatile memory, a non-transitory computer readable medium, storage, or any suitable combination thereof. For example, memory 204 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 204 can have encoded thereon a computer program for controlling operation of the motion data capture system 102.

In some embodiments, communications systems 208 can include any suitable hardware, firmware, and/or software for communicating information to the on-site game engine server 110, or over communication network 114 and/or any other suitable communication networks. For example, communications systems 208 can include one or more transceivers, one or more communication chips and/or chip sets, etc. In a more particular example, communications systems 208 can include hardware, firmware and/or software that can be used to establish a Wi-Fi connection, a Bluetooth connection, a cellular connection, an Ethernet connection, etc. In some examples motion capture data, including positional and rotational coordinates of a subject can be streamed to server 110 through communications system 208. In some examples, communications system 208 can be in communication with the communications network 114 and can stream motion data thereto, receive instructions or configurations, receive firmware or software updates, etc.

As further shown in FIG. 2, the on-site game engine server can include a processor 210, inputs 212, communications system 214, memory 216, and display 218. The processor 210 can be generally similar to processor 202 and can include any of the described devices or systems described with respect to processor 202. Similarly, the communications system 214 can be generally similar to communications system 208, as described, and hardware for memory 216 can be generally similar to hardware for memory 204. In some embodiments, the display 218 can include any suitable display device, such as a computer monitor, a touchscreen, a television, a projector, a smart phone, a virtual reality headset, augmented reality goggles, etc. In some embodiments, inputs 212 can include any suitable input devices and/or sensors that can be used to receive user input, such as a keyboard, a mouse, a touchscreen, a microphone, a camera, etc. In some embodiments, either or both of the display 218 and the inputs 212 can be omitted from the on-site game engine server 110.

The memory 216 can further include at least a portion of the software for game engine 112, including skeletal meshes, compression algorithms, rendering algorithms, etc. The processor can communicate with the memory 216 to retrieve instructions and objects stored on the memory 216 to perform processing of motion capture data received from the motion capture system through communications system 214, and to stream compressed positional data, uncompressed positional data, three-dimensional renderings, skeletal meshes, etc., to downstream devices over the communications network 114. The communications system 214 can be in communication with the communications network 114 to publish data to other devices connected thereto or to receive data from other devices connected thereto. As shown, communication between the motion capture system 102 and the on-site game engine server 110 can be relatively direct, relative to connections to a device over the communications network 114, which can be a WAN. A more direct connection (e.g., through ethernet or a LAN) can improve network bandwidth and/or speed of a connection between the on-site game engine server 110 and the motion capture system 102. In some cases, this can allow for lower latencies for communication between the motion capture system 102 and the on-site game engine server 110, which can result in higher-fidelity streaming of positional data from the on-site game engine server than can be achieved if the motion capture system 102 and the on-site game engine server 110 communicated over a WAN (e.g., the communications network 114).

As illustrated, the remote dedicated server 116 can communicate with the on-site game engine server 110 through the communications network 114. The remote dedicated server 116 can include a processor 220, inputs 222, communications system 224, memory 226, and a display 228. The hardware for the processor 220, inputs 222, communications system 224, memory 226, and display 228 can be generally similar to the hardware for the processor 210, inputs 212, communications system 214, memory 216, and display 218, respectively.

The game hosting platform 118 hosted by the dedicated server 116 can receive positional data (e.g., positional coordinates and rotational values) from the on-site game engine server 110 through the communications system 224. The positional data can be processed at the processor 220. In some examples, the positional data can be decompressed at processor 220, and in some examples, the positional data can be decrypted by processor 220. The processor 220 can also communicate with and receive instructions from memory 226, which can store software for the remote game hosting platform 118, which can include software for decompressing (e.g., using lossless decompression, and/or using techniques to infer data omitted in lossy compression), decrypting, and processing positional data (e.g., positional data received from one or more on-site game engine servers).

Further, as shown in FIG. 2, the client device 120 can be operatively connected to the on-site game engine server 110 and/or the remote game engine server 116 through the communications network 114. The remote game engine server 116 can include a processor 230, inputs 232, communications system 234, memory 236, and display 238. The hardware for the processor 230, inputs 232, communications system 234, memory 236, and display 238 can be generally similar to the hardware for the processor 210, inputs 212, communications system 214, memory 216, and display 218, respectively. As described with respect to FIG. 1, the client device can receive streamed positional data (e.g., positional data for the subject 106, other subjects, characters, objects, etc.) from either or both of the on-site game engine server 110 and the dedicated server 116 (e.g., through communications system 234), and can render 3D models of the subject (e.g., using skeletal meshes and digital skeletons stored in memory 236) and display the rendered data to a user through display 238. In an example, the display 238 can be a head-mounted display (e.g., a virtual reality headset, augmented reality headset, etc.) as can advantageously allow the user to immersively experience a virtual environment including the three-dimensional model performing the motion of the subject 106. However, the display 238 can comprise any other technique or combination of techniques to presenting visual data to a user.

Figure 3:
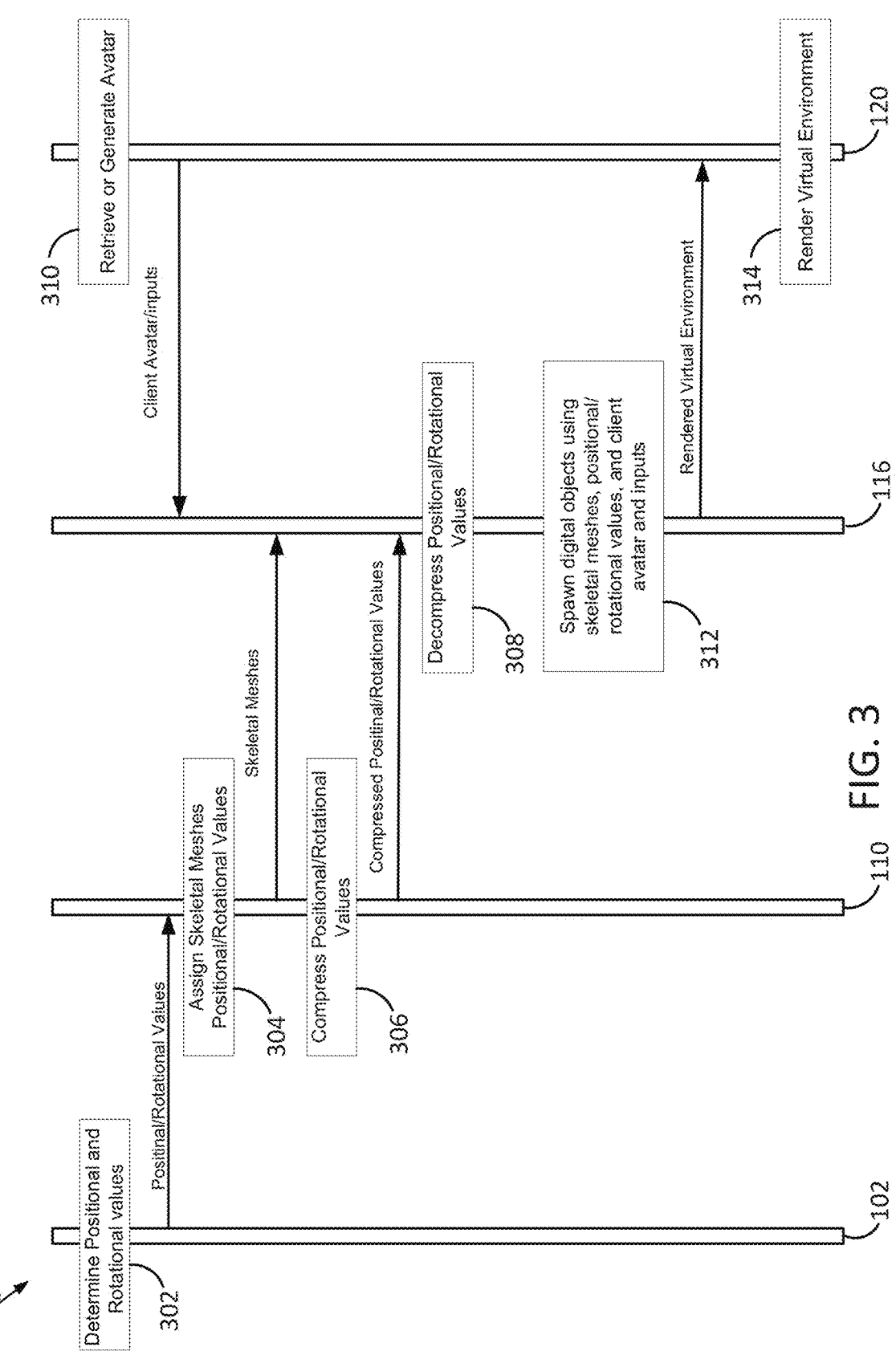
FIG. 3 is an example schematic diagram illustrating a flow of data between components of the system shown in FIG. 1 according to some embodiments.

FIG. 3 illustrates an example flow of data between devices in a streaming system, according to some embodiments of the present invention. As shown in FIG. 3, and described above, at block 302 the motion data capture system 102 can determine positional and rotational values. Positional and rotational values can be coordinates associated with the movement of a subject (e.g., the athlete 106) or multiple subjects, and can be determined, calculated, or derived from visual data captured by sensors (e.g., cameras 104) of the motion data capture system. Determining the positional and rotational values, as shown at block 302 can include applying a machine learning model(s) to visual data to identify points along a subject's body and track motion of the identified points. In some cases, identification of points along a body of a subject can include identifying reflective markers physically positioned at the points, or otherwise receiving data from sensors located at the points to be tracked and for which positional and rotational data is determined. Coordinates for positional values can include a numerical value representative of a fixed point along separate axes. For example, as illustrated in FIG. 1, an x axis can indicate a lateral position, a y-axis can indicate a longitudinal position, and a z axis can indicate a vertical position relative to an origin. In some embodiments, axes can be otherwise labeled. For example, in some examples, a z axis indicates a longitudinal position and a y axis indicates a vertical position. If a point on the user's body is located at the origin, then, positional data for that point can comprise a value of 0 along each of the x, y, and z axes. In some embodiments, coordinates for displacement of a point relative to an origin can be float values and can thus be provided in decimal format (e.g., encoded in a string of binary numbers). For example, in some embodiments, position can be measured, and coordinates can be provided in inches, feet, meters, centimeters, etc., and the coordinate values can include the measured distance along the axis out to any suitable number of decimal points (e.g., to a hundred millionth, a ten millionth, a millionth, a hundred thousandth, a ten thousandth, a thousandth, a hundredth, or a tenth of an inch, foot, meter, centimeter, etc.). In some embodiments, positional coordinates of a point can be determined relative to another point. For example, coordinates of a hand can indicate a displacement of the hand relative to a sternum, or to another point along a subject's body. In some embodiments, rotational values can be measured and provided in spherical coordinates, which can specify a distance from an origin (e.g., "rho" or $\rho$) an angular offset from a first axis (e.g., "theta" or $\theta$) and an angular offset from a second axis (e.g., "phi" or $\varphi$). In some examples, motion data can be provided in vector form, and can include directional or velocity data. For example, in addition to positional coordinates, motion data can further include a current linear or rotational velocity of the corresponding point in one or more directions.

The motion data capture system can provide (e.g., stream) the positional and rotational values to the on-site game engine server 110, which can perform further processing on the values, and stream motion data to downstream system(s). For example, at block 304, the server 110 can assign skeletal meshes to rotational and positional values received from the motion data capture system 102. The skeletal meshes can digitally approximate bodies of subjects, and the positional and rotational values can be assigned to points thereon to produce motion of a digital body mirroring the motion of the subject. For example, a digital mesh can comprise a digital representation of a human, with movable parts and joints corresponding to movable portions of a human body. Among the coordinates received from the system 102 can be positional data for a hand of a subject and positional data for an elbow of the subject. The server 110 can associate the positional data for the hand of the subject with a digital representation of a hand along the skeletal mesh comprising the digital human body, and correspondingly, can associate the positional coordinates of the elbow of the subject with the digital representation of an elbow along the skeletal mesh. Thus, the hand of the skeletal mesh can be rendered to move in concert with the hand of the subject and the elbow of the skeletal mesh can be rendered to move in concert with the elbow of the subject. In some cases, the server 110 analyzes the coordinates received from the system 102 and assigns skeletal meshes on the basis of positional relationships between points of the coordinates. For example, the server 110 can determine that coordinates provided by the system 102 correspond to a quadruped (e.g., a horse) and can assign a quadruped skeletal mesh to the data. In another example, the server 110 can determine that coordinates provided by the system 102 correspond to a biped (e.g., a human), and can assign a bipedal skeletal mesh to the data. In some embodiments, the data received from the system 102 can include information regarding skeletal relationships and can indicate that certain points are associated with the same subject. In some examples, a selection of a skeletal mesh can be received from a user (e.g., via a user interface), and the selected skeletal mesh can be assigned to the motion data.

In some cases, the server 110 can calculate a scaling factor associated with streamed data. For example, the server 110 can include in memory (e.g., memory 146) a single bipedal (e.g., human) skeletal mesh to be associated with positional data received from the system 102. The skeletal mesh can be representative of a human of a particular size (e.g., a four-foot-tall human, a five-foot-tall human, or a six-foot-tall human, or a human of any other height) and features of the human can have dimensions that are average or characteristic to a foot human of the particular size. The data received from system 102 can include positional data for a five-foot-tall subject and a six-foot-tall subject. The coordinates of the six-foot-tall subject can map directly onto the associated skeletal mesh, as the dimensions of the skeletal mesh would approximately equal the dimensions of the six-foot-tall subject. However, if the coordinates for the five-foot-tall subject were mapped directly onto the skeletal mesh, the coordinates would be associated incorrectly with portions of the skeletal mesh. A coordinate corresponding to a hand of the subject can be positioned along an arm of the skeletal mesh, etc. Thus, a scaling factor can be calculated for the skeletal mesh, to adapt the mesh to coordinates of differently sized subjects. In some embodiments, multiple scaling factors can be calculated for a single subject (e.g., a scaling factor for an arm, a distance between a hand and an elbow, etc.). In some embodiments, a scaling factor can be applied to the positional coordinates received, and the coordinates can be scaled to match a given skeletal mesh. In some examples, streamed data from the on-site game engine server 110 does not include scaling information and includes only the raw positional data. Scaling information can be calculated at the dedicated server 116 and the dedicated server 116 can scale skeletal meshes within the virtual environment.

Once skeletal meshes have been assigned to positional and rotational values, the on-site game engine server 110 can communicate the meshes associated with the positional data to downstream systems, including, as shown, the remote game engine server 116. Thus, the remote game engine server 116 can be provided the information necessary to interpret and render positional and rotational values provided by the on-site game engine server 110, and correctly associate motion coordinates with skeletal meshes.

At block 306, the on-site game engine server can compress the positional and rotational values received from system 102. In some embodiments, the values are directly compressed in accordance with conventional lossless compression techniques. Additionally, in some embodiments, compressing motion data (e.g., positional and rotational values) can include reducing a total size of the data (e.g., using lossy compression techniques). For example, the size of the data to be streamed can be reduced by reducing a precision of the data. As another example, the size of the data to be streamed can be reduced by reducing a number of data points to be streamed (e.g., omitting transmission of one or more datapoints corresponding to a certain part of a subject's body). Where data is too large to be streamed, for example, the precision of the coordinate data can be reduced by rounding or truncating values of the data (e.g., measurements can be rounded or truncated from a ten-thousandth of a centimeter to a tenth of a centimeter). Further, the volume of data points can be reduced to reduce a bandwidth required to stream the motion data, reduce a memory required to store the streamed motion data, and reduce computational resources required to process the streamed motion data. As an example, a motion data capture system may typically provide a first number of coordinate values for a first number of points along a subject's body, and a network or other computational constraint can impose a functional limit between the on-site game engine server 110 and the remote game engine server 116 so that only a threshold number of coordinate values can be streamed from the server 110 to the server 116, the first number of coordinate values being less than the threshold number of coordinate values. In some embodiments, lossless compression can be performed on data after the data has been reduced using lossy compression techniques. When the system 102 provides positional and rotational values for two subjects the combined number of coordinate values of the two subjects can exceed the threshold number and the server 110 can choose which points to be included in the positional values sent to the remote server 116, and can omit a number of coordinate values of one or both of the subjects so that the number of coordinate values to be streamed is less than the threshold number. In some cases, coordinate values for points to be omitted can be selected based on an ability to infer the point from other points. For example, ML techniques can identify relationships between body parts (e.g., points along a subject) and can provide models to predict, on the basis of a position of a first point or set of points, a position of a second point.

The compressed positional and rotational values can be streamed to the dedicated server 116, to allow the game hosting platform 118 to process the positional and rotational values. For example, the game hosting platform 118 can orient, using the provided skeletal meshes and motion data, a digital skeleton or skeletal mesh within a virtual environment, and can further orient other digital objects (e.g., characters, avatars, digital structures, etc.) within the virtual environment corresponding digital bodies in a virtual environment. The dedicated server 116 can provide the virtual environment for immersive experiences for users thereof and can be operatively connected to a user device 120 (e.g., a client) to stream information of the virtual environment to the user device 120, including motion data of skeletal meshes which can correspond to motion data of the subject. In some embodiments, as shown at block 310, data from the user device 120 can be used to construct the virtual environment. For example, the user device may contain (e.g., in memory 236 shown in FIG. 2) an avatar of the user (e.g., a three-dimensional character associated with the user), and the user device can provide information associated with the avatar to the server 116, which can position the avatar within the virtual environment, relative to skeletal meshes, other avatars, and digital objects and structures in the virtual environment. The server 116 can also receive, from the client device 120 other information including settings and configurations associated with the virtual environment to be rendered, visual information, etc.

At block 312, the remote game engine server can spawn digital objects using the skeletal meshes, positional and rotational values, and client avatars and inputs. Spawning the digital objects can include positioning the digital objects within a virtual environment. In some embodiments, spawned digital objects can include information of 3D digital bodies for each subject monitored by system 102. Spawning the digital objects can further include associating the positional and rotational data to points along the digital bodies, so that movement of the 3D digital bodies in the virtual environment mirrors movement of the subject in the physical environment. Further, an avatar of the user, or other objects relevant to input from the user can be spawned into the virtual environment. In some embodiments, a spawned avatar (e.g., based on information received from the client device 120 at block 310) can include information about a 3D model associated with the avatar, and can allow devices in communication with the dedicated server to render avatars for other users. Positional information of the digital environment can be streamed to the user device 120.

At block 314, the game engine 124 hosted on the user device 120 (i.e., as shown in FIG. 1) can receive streamed information of the virtual environment, which can include motion data having positional coordinates for digital objects in the virtual environment. The digital objects can include the digital skeletons corresponding to the subject 106 or other subjects for which motion data is captured by a motion data capture system (e.g., motion data capture system 102). In some embodiments, the game engine 124 can render digital bodies based on the digital skeletons by applying digital meshes to the digital skeletons. The rendered digital bodies can be output to the display 238 to allow the user to experience the digital environment immersively or otherwise. The game engine 124 can render the virtual environment from a perspective of the user and can update the virtual environment when the perspective of the user changes. If the position of the user changes within the virtual environment, the user device can provide positional information of the user to the dedicated server 116 (e.g., positional data of an avatar of the user can be provided to the dedicated server at block 310) to allow other user devices to correctly render an avatar of the user within the virtual environment. The game engine 124 can render a digital body for the subject 106 within the virtual environment, and display the virtual environment including the digital body at the display 238 such that the user can immersively experience or visualize the movement of the subject or subjects in real-time, or near-real-time (e.g., in a three-dimensional environment).

Figure 4:
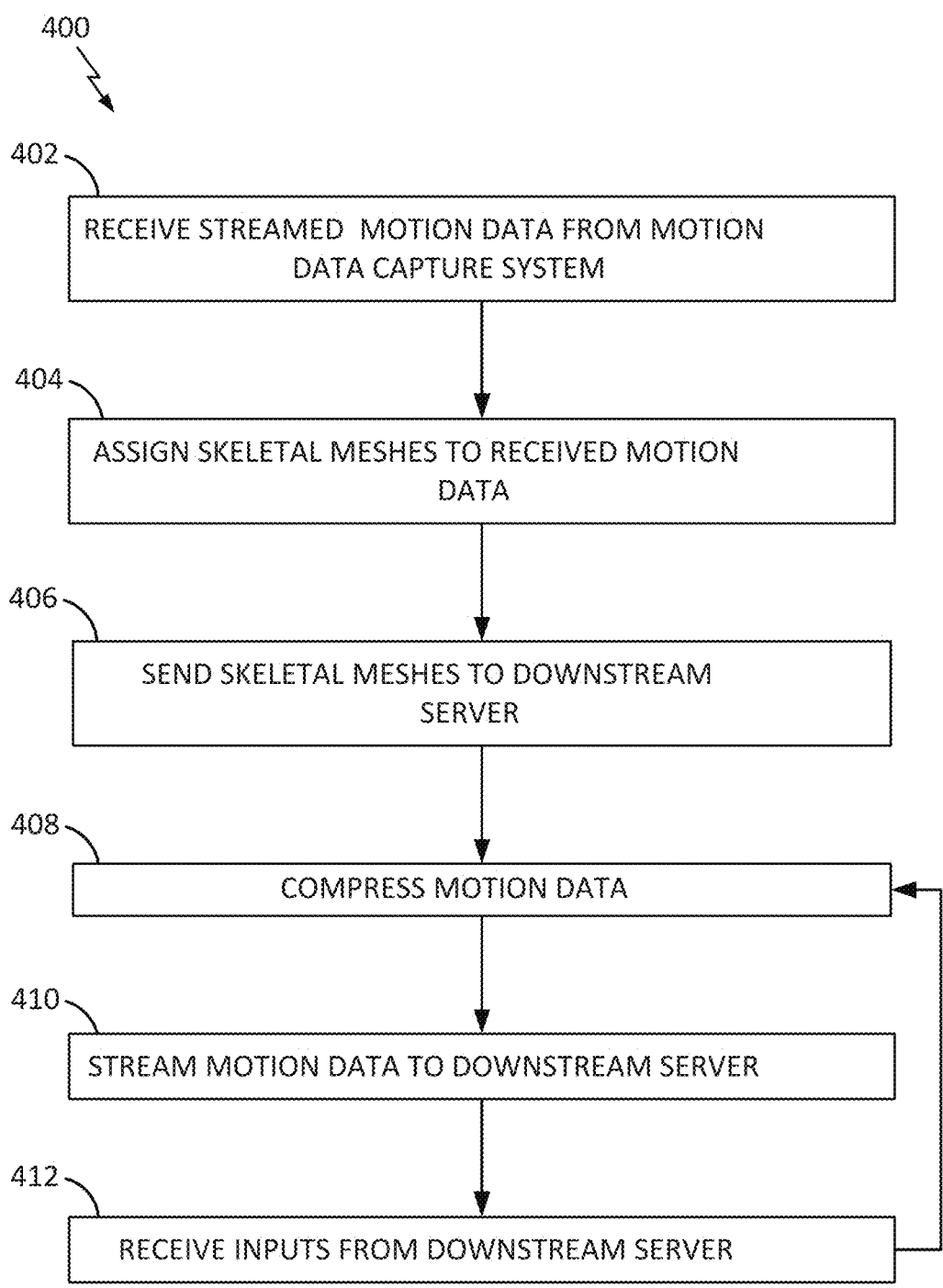
FIG. 4 is a flowchart showing an example process performed by an on-site game engine server, according to some embodiments.

FIG. 4 is a flowchart showing an example process 400 performed by an on-site game engine server (e.g., server 110), according to some embodiments The illustrated process 400 can be performed by an on-site game engine server (e.g., server 110) to achieve streaming of motion data, including either or both of positional and rotational values, to produce immersive three-dimensional experiences for users. As shown, at block 402, the server 110 can receive streamed motion data from a motion data capture system (e.g., motion data capture system 102). The streamed data received can include positional coordinates for points of a subject for which motion data is captured and can further include rotational coordinates for the same points of the subject. In some embodiments, the streamed data can include scaling information. In some embodiments, the streamed motion data can include information associating coordinates of given points with a particular subject or body on which the point resides.

At block 404, skeletal meshes can be assigned to the received motion data, and coordinates of certain points (e.g., points 108) can be assigned to corresponding points along the skeletal mesh. In some embodiments, at 404, the on-site game engine can format motion data received from the motion capture system for use in a multiplayer game environment. For example, the motion data from the motion capture system can be associated with different portions of a game object (e.g., a character, an inanimate object, etc.).

At block 406, the on-site game engine server 110 can send the skeletal meshes associated with the motion data to a downstream device (e.g., one or both of dedicated server 116 and client device 120), to enable the downstream server to spawn digital objects in a virtual environment corresponding to the subject or subjects for which motion data is captured. In some embodiments, the game engine server 110 can send the skeletal meshes to the client device 120 directly, and no downstream server is provided between the on-site game engine server 110 and the client device 120. In some embodiments, skeletal meshes and/or digital skeletons are stored in a memory of the downstream client, or can be assigned by a client device, and the game engine servers can send data which can allow skeletal meshes to be associated with streamed motion data. In some embodiments, block 406 is optional, and streaming motion data to downstream servers do not require associated information related to digital skeletons and skeletal meshes.

At block 408, the on-site game engine can compress the motion data. The motion data can be compressed according to any known compression methods or algorithms as described above. As additionally described above (e.g., with respect to block 306 shown in FIG. 3), compressing the motion data can include reducing one or more of a volume and precision of the motion data before streaming to the downstream device (e.g., one or both of a downstream server and client device).

At block 410, the on-site game engine server 110 can send (e.g., stream) the motion data, comprising the compressed positional or rotational coordinates of one or more subjects to the downstream device. In some embodiments, in-flight encryption (e.g., using a transport layer security ("TLS") protocol) can be used to encrypt the data being streamed. In some embodiments, the streamed data can include a hash which can enable a downstream client to verify an integrity thereof. In some embodiments, the streamed data can include scaling information for coordinates or skeletal meshes and can further include data linking particular coordinate data with corresponding skeletal meshes, or with positions thereon. In some embodiments, scaling information is not provided (e.g., streamed) with the motion data.

In some embodiments, the on-site game engine 112 can output the motion data via any suitable network notification call (e.g., to a dedicated server). For example, the on-site game engine 112 can use remote procedure calls (RPCs) to output the motion data to the dedicated server 116.

At block 412, the on-site game engine server 110 can receive inputs from a downstream device (e.g., the downstream server 116 or the client device 120), which can be indicative of a state of a game or virtual environment into which the motion data is streamed. In some examples, inputs of a downstream client can indicate a movement of a user in the virtual environment. A user may, for example, adjust position within the virtual environment so that only one subject is within view of the user, or only a portion of a subject is within view of the user. The input from the downstream client can thus be consumed by the on-site game engine server 112, and in some cases can be used to select coordinates for points along a skeletal mesh to include in motion data streamed to the downstream client.

At block 412, process 400 can continuously evaluate inputs received at block 412, and the inputs received can be used at block 410 to determine motion data for digital bodies to be compressed or excluded from streaming. For example, motion data to compress or exclude can be motion data for digital bodies that may be outside of a scene to be rendered and displayed to the user. In some embodiments, motion data to be streamed can be restricted to motion data which can be viewed by the user in a given time frame, provided the user's position within a virtual environment.

FIG. 5 is a flowchart showing an example process 500 that can be performed by a remote game engine server (e.g., server 116 hosting game hosting platform 118 shown in FIG. 1) to provide a streamed immersive digital experience to users, according to some embodiments. The process 500 can be executed by a dedicated server hosting a game hosting platform or other server downstream of an on-site game engine server (e.g., dedicated server 116 hosting game hosting platform 118, or any downstream client of on-site game engine server 110).

At block 506, the dedicated server can receive skeletal meshes from an on-site game engine server to which positional and rotational coordinates of motion data can be associated. In some embodiments, the remote game engine server can include stored skeletal meshes and can perform an assignment of motion data to the stored skeletal meshes, without the need to receive skeletal meshes from the on-site game engine server. In some embodiments, performance of block 506 can be optional, and a dedicated server can include skeletal meshes in a memory thereof and perform assignment of motion data to the skeletal meshes without the need to receive skeletal meshes, digital skeletons or information thereof from an on-site game engine server. In some cases, skeletal meshes can be provided to the server by a user or operator of the system. In some cases, skeletal meshes can be stored in a memory, and can be manually assigned (e.g., in response to an input from a user) to one or more positional coordinates.

At block 508, the dedicated server (e.g., dedicated server 116 shown in FIGS. 1 and 2) can receive object information from the client device, which, in some cases, can include an avatar of the user. In some embodiments, additional objects can be provided by a client device to the dedicated server to be spawned (e.g., generated and rendered) in the virtual environment. In some embodiments, no object or avatar information is received from the client device.

At block 510, the dedicated server can spawn objects into the virtual environment, corresponding to the received skeletal meshes, and the digital object information received from the client device. In some examples, spawning the objects can include creation of three-dimensional representations of the objects in the virtual environment. In some cases, additional information can be layered onto digital object when spawned. For example, the virtual environment can include a football game, and skeletal meshes received from the on-site game engine server can correspond to players in the game. Spawning the skeletal meshes of the players can include positioning the players within a virtual environment on a virtual football field, for example. In some embodiments, an avatar of a user, or a position from which a user views the virtual environment can be spawned into the virtual environment, and the avatar and/or position of the user can be located within the virtual environment relative to digital objects corresponding to subjects.

At block 512, the dedicated server can receive, from the on-site game engine server, motion data of subjects for which motion data was captured. In some embodiments, the motion data received can include compressed motion data. For example, the motion data can be motion data compressed using lossless compression techniques. In some embodiments, the motion data received by the dedicated server can be compressed using lossy compression techniques, which can include, for example, receiving a subset of points for motion data of a subject. In some embodiments, lossy compression for motion data can include receiving data points that are truncated or otherwise less precise than the motion data captured by a motion capture system (e.g., the system 102 illustrated in FIGS. 1 and 2). In some embodiments, lossy compression for streaming of motion data can include receiving motion data at a lower sampling rate. In some embodiments, data streamed to the dedicated server is not compressed, and block 510 can be omitted from process 500.

At block 514, dedicated server can decompress the motion data. Decompression can be performed using known decompression techniques (e.g., decompression for lossless compression techniques). In some embodiments, at block 514, process 500 can infer data points omitted from the compressed motion data received from the on-site game engine server (e.g., using known relationships between points along a body, ML techniques for inferring omitted points from points received at the dedicated server). In some embodiments, data streamed to a dedicated server is not compressed, and block 512 can be omitted from process 500.

At block 516, the dedicated server can position digital objects in a virtual environment, based on the motion data deceived at block 512 render dynamic digital objects in the virtual environment, based on the decompressed motion data, and the spawned digital objects. Positioning the dynamic digital objects can comprise associating particular coordinates with specific points along a skeletal mesh positioning the skeletal mesh within the virtual environment. In some cases, the dedicated server can infer data where motion data is incomplete or is missing. For example, in some cases, as described above, certain coordinates can be omitted from motion data sent to the dedicated server, in order to reduce latency or otherwise preserve or improve a performance of the streaming system. In some embodiments, the dedicated server can infer the motion of the parts of the digital objects for which positional or rotational coordinates were omitted. In some embodiments, including where connection is interrupted to the on-site game engine server, where reception of the motion data is delayed the dedicated server can predict a motion of digital objects. The prediction can be based, in part, on the previous dynamics of the digital objects, and can provide a viewing user a relatively uninterrupted viewing experience. When further motion data is received from the on-site game engine server, the further motion data can override the predicted motion of the digital objects, and the positional data for digital objects within the virtual environment can return to a state which can mirror motion of subject for whom motion data is captured.

At block 518, dedicated server can stream position information of objects in a virtual environment or digital objects to the client device. Position information streamed can include coordinates of digital objects within the virtual environment. Further, the positional information streamed can include the motion data decompressed at block 514. In some embodiments, the dedicated server can choose positional data to be streamed based on computing and/or networking constraints. For example, the dedicated server can apply lossy compression techniques, as described, to preserve a performance or speed of streaming the positional data. In some embodiments, the positional data can be compressed in-flight (e.g., using TLS).

At block 516, the dedicated server can receive user input from the client device. In some embodiments, one or more portions of the virtual environment can be interactive, and can respond to actions or inputs of a user. For example, a movement of a user can necessitate a change in orientation and rendering of the virtual environment and objects therein to accommodate the updated perspective of the user. The user input can include positional information of the user within the virtual environment. For example, a user participating in a shared digital experience, such as watching a football game with one or more other users, may be represented in the shared experience by an avatar, which can facilitate interaction between users that are participating in the shared digital experience. In such an example, the user may desire to change a position from which the user is experiencing the shared experience. In a particular example, the user can be positioned in virtual stands observing a football game, in which players in a physical football game are represented in the virtual environment by digital objects (e.g., bodies), the movements of which correspond to the movements of respective football players in a football game that is being played in the physical world, where the motions of the players and other objects (e.g., the ball, referees, etc.) are captured by a motion capture system. From that vantage in the virtual environment, all players may be visible to the user. The user may desire to change positions and observe the game from a position on the field and can cause their viewpoint to change via a user input device. The dedicated server can receive user input and update a position of the avatar associated with the user within the virtual environment, and the updated position of the user can be streamed to the client device, and/or other client devices connected to the dedicated server, which can facilitate accurate placement of the user's avatar in the virtual environment.

At block 522, the dedicated server can communicate inputs to the on-site game engine server, which can include inputs associated with a position of the user. For example, when a change in user position changes a scene of the user or places the user in proximity to digital objects not included in a previously streamed data, the dedicated server can communicate an input to the on-site game engine server. The input can partially determine the content of the compressed motion data received by the remote game engine server at block 512. For example, if no user is observing certain objects, the on-site game engine can omit data corresponding to the objects from transmission, which can reduce the amount of data communicated to the dedicated server. In some embodiments, the input can be used to remove a digital object corresponding to a particular player from the compressed motion data received by the remote game engine server at block 512. In some embodiments, the input can be used to add a digital object corresponding to a particular player to the compressed motion data received by the remote game engine server at block 512. In some embodiments, block 522 can be omitted from the process 500.

Figure 6:
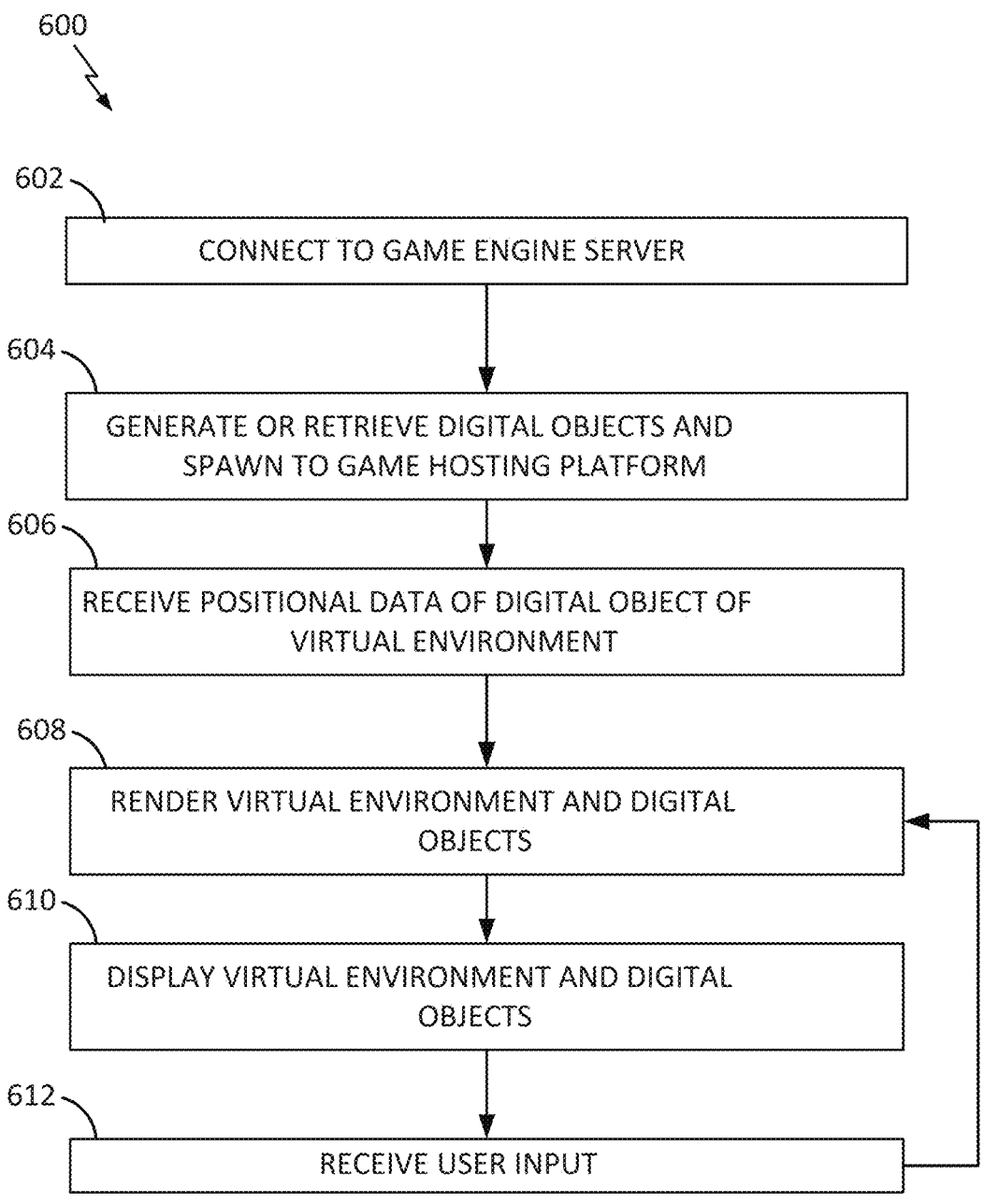
FIG. 6 is a flowchart showing an example process performed by a client device to provide a streamed immersive digital experience to one or more users, according to some embodiments.

FIG. 6 illustrates a process 600 which can be executed by a client device (e.g., client device 120) to stream content of an immersive digital experience environment, which can be a virtual reality environment. At block 602, the client device can connect to a game server, which, in some embodiments is a game server that is on-site (e.g., on-site game engine server 110) with respect to a motion data capture system (e.g., motion data capture system 102) and in other embodiments is a game engine server that is remote (e.g., remote game engine server 116) relative to a motion data capture system.

At block 604, digital objects, including, in some examples, an avatar for a user can be created or retrieved (e.g., from memory 166) by the client device, and sent to the game server to be spawned in a virtual environment. Spawning the avatar and/or other digital objects into the virtual environment can include positioning the avatar and digital objects within the virtual environment.

At block 606, the client device can receive streamed positional data of the virtual environment, which includes digital bodies with motion corresponding to the motion of a subject or subjects in a physical space (e.g., subject 106). The streamed data can include the positional and rotational data for digital objects, and streamed motion data for dynamic digital objects that correspond to motion of a subject (e.g., motion data captured by motion data capture system 102). In some embodiments, the positional data received by the client device can be compressed, and the client device can decompress the positional data received (e.g., using decompression technique for lossy and/or lossless compression techniques). In some embodiments, upon receiving the positional data, the data can be decrypted (e.g., using TLS).

At block 608, the client device can render digital objects in a virtual environment (e.g., using off-site game engine 124), based on the streamed data of the virtual environment and digital objects therein received at block 606. Rendering the dynamic digital objects can comprise associating particular coordinates of the motion data with specific points along a skeletal mesh and rendering movement of the skeletal mesh and associated digital object upon an update in the positional or rotational coordinates of the motion data associated therewith. In some embodiments, rendering the virtual environment can include creating a representation of a 3D scene of the virtual environment based on the positions of the objects, the skeletons, meshes, textures, etc., and creating a visual representation appropriate for display. In some cases, the off-site game engine hosted on the client device can infer data where motion data is incomplete and/or is missing. For example, in some cases, as described above, certain coordinates can be omitted from motion data sent to the dedicated server and/or the client device in order to reduce latency or otherwise preserve or improve a performance of the streaming system. In some embodiments, the off-site game engine can infer the motion of the parts of the digital objects for which one or both of positional and rotational coordinates were omitted. In some embodiments, including where connection is interrupted to the on-site game engine server, where reception of the motion data is delayed, or where a user input (e.g., a change in perspective of the user) necessitates an update in rendered data before further motion data is provided by the on-site game engine server, the remote game engine server can predict a motion of digital objects (e.g., using inverse kinematics techniques). The prediction can be based, in part, on the previous dynamics of the digital objects, and can provide a viewing user a relatively uninterrupted viewing experience. When further motion data is received from the on-site game engine server, the further motion data can override the predicted motion of the digital objects, and the rendered objects within the virtual environment can return to a state which can mirror motion of subject for whom motion data is captured.

At block 610 the user device can display (e.g., at display 238 shown in FIG. 2) the rendered virtual environment to the user. The virtual environment can be three-dimensionally displayed to the user, and the user can view digital objects, including dynamic digital objects from multiple perspectives. In some cases, the user can view 3D digital bodies corresponding to a subject for which motion data is captured. In some embodiments, an avatar of the user can be displayed moving relative to the dynamic digital objects. In some embodiments, the display of the rendered virtual environment can be presented from a perspective of a virtual camera positioned in the virtual environment, which can be adjusted by the user. Displaying the virtual environment can include updating a display based on received updates to the rendering of the virtual environment. In some embodiments, when necessary, displaying the rendering of the virtual environment can include performing prediction of motion data in the rendered virtual environment. For example, in some embodiments, including where connection is interrupted to the game engine server, where streaming from the game engine is delayed, or where a user input (e.g., a change in perspective of the user) necessitates an update in rendered data, the client device can predict a state of the virtual environment and render the predicted virtual environment to the user, until further data is obtained from the game engine. Prediction of motion data by the client device (e.g., using inverse kinematics techniques and/or any other suitable techniques) can thus serve to provide a relatively uninterrupted user experience, even in cases where authoritative motion data for digital bodies in a virtual environment has not yet been obtained.

At block 612, the client device can receive inputs from a user. Inputs from the user can affect a state of the virtual environment, or a visual rendering thereof. For example, as described above, when a user changes perspective in a virtual environment (e.g., through turning of the user's head while a virtual reality headset is mounted to the user's head) the off-site game engine can update a rendering of the virtual environment. The client device can continue to receive inputs, provide the inputs to the off-site game engine, and receive updated renderings of the virtual environment until the user exits the virtual environment (e.g., by removing a virtual reality headset, finishing a game, etc.). In some embodiments, an input can include an orientation of a headset worn by the user, and in response to a change in head position, the process 600 can update the rendering at block 608 to display the virtual environment from an adjusted perspective. In some embodiments, the input can be received through input 232 shown in FIG. 2. In some embodiments, the input can correspond to a movement of the user within the virtual environment.

Figure 7:
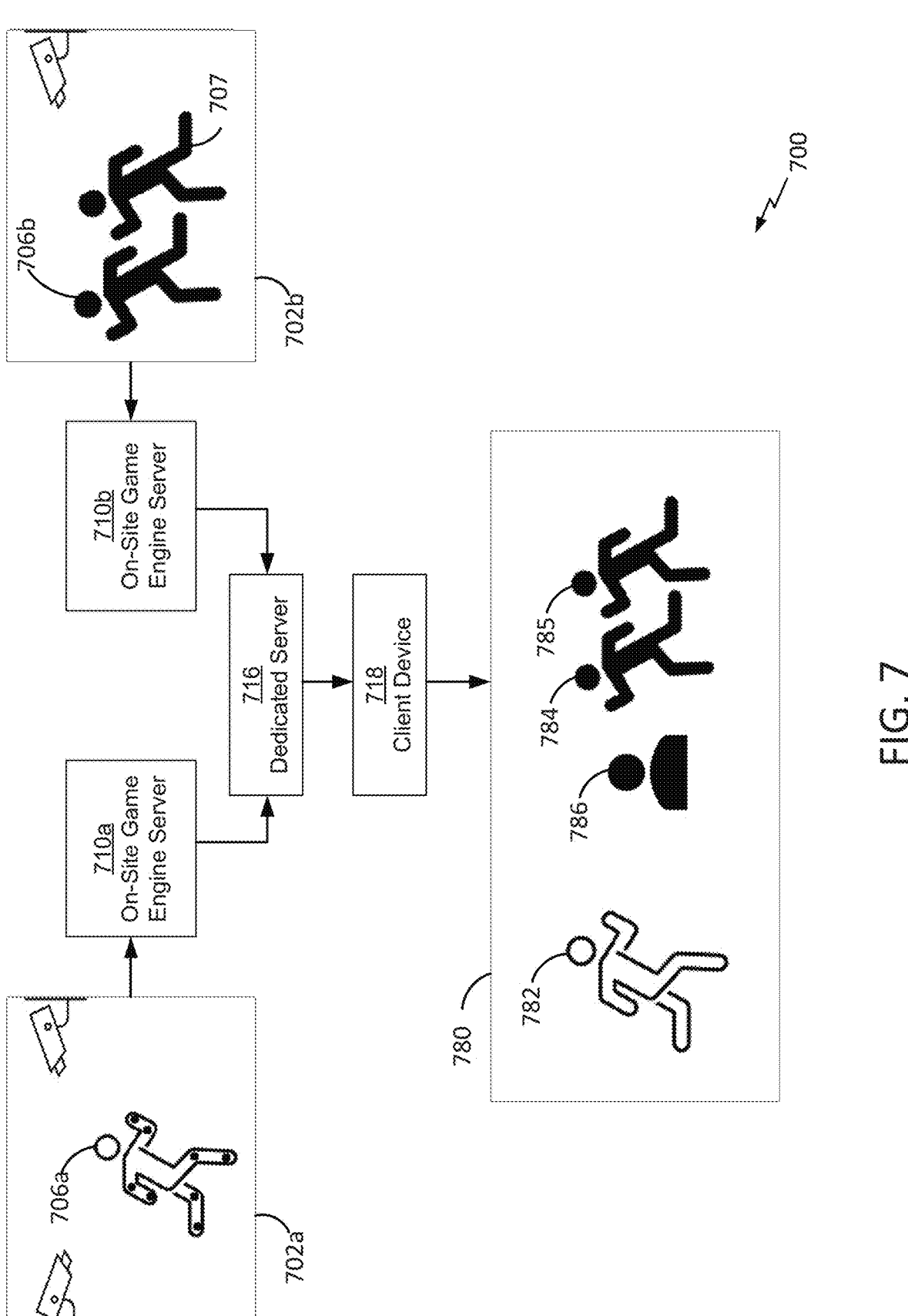
FIG. 7 is a schematic representation of a system for providing immersive digital experience using streamed positional data from multiple geographic locations, according to some embodiments.

FIG. 7 is a schematic representation of a system for providing immersive virtual reality using streamed positional data from multiple geographic locations, according to some embodiments. In some embodiments, motion of subjects can be captured at different geographic locations and streamed to a single virtual environment. A user within the virtual environment can thus observe digital bodies corresponding to subjects in different geographical locations in a proximity to each other in the virtual environment. In some embodiments, on-site game engine servers in different geographical locations can stream positional data to a single remote game engine server to render digital bodies corresponding to physical subjects into the same virtual environment. For example, FIG. 7 illustrates a streaming system 700 including two motion data capture systems 702a, 702b, which are located in separate geographic locations. In some embodiments, a streaming system can include more than two motion data capture systems located in more than two geographical locations. The motion data capture system 702a, 702b can stream positional data for subject 706a to on-site game engine server 710a. In some embodiments, a motion data capture system can capture motion data for more than one subject. Thus, as illustrated, motion data capture system 702b can stream positional data corresponding to motion of subject 706b, 707 to on-site game engine server 710b.

As further shown in FIG. 7, each on-site game engine server 710a, 710b can stream positional data (e.g., positional and/or rotational coordinates associated with points of a subject) to a dedicated server 716. The dedicated server 716 can process the positional data from each of the servers

710a, 710b and can place the subjects in a common virtual environment 780, which can include a digital body 782 corresponding to the subject 706a, a digital body 784 corresponding to the subject 706b, and a digital body 785 corresponding to subject 707. A user 786 can be virtually positioned within the virtual environment 780 (e.g., a virtual camera can provide the user a perspective within the virtual environment, or an avatar of the user can be positioned in the virtual environment). The dedicated server 716 can stream positional information of the virtual environment 780 to a client device 718, which can render the virtual environment 780 and display the virtual environment 780 to the user 786. The user 786 can view motion of all of the digital bodies 782, 784, 785 simultaneously at the client device 718. In some embodiments, one of the on-site game engine servers 710a, 710b can stream positional data to the dedicated server 710a, 710b, and the receiving dedicated server can position the digital bodies 782, 784, 785 in the virtual environment 780, and stream positional data of the virtual environment to the client device 718. In some embodiments, a viewer of a virtual environment (e.g., a user of client device 718) can be a subject of one or all of the motion data capture systems 702a, 702b. For example, the subject 706a, for example, can wear a headset which can comprise a client device which can be in communication with the remote game engine server 716, and can display to the subject 706a the virtual environment rendered thereby.

In some cases, subjects of a motion capture system (e.g., subjects 706a, 706b, and 707) can view a virtual environment into which motion data corresponding their movements is streamed. For example, with continued reference to FIG. 7, the client device 718 can be a head mounted display worn by one or more of the subject 706a. The subject 706a can thus view the digital bodies 784, 785 corresponding to the other subjects 706b, 707 within the virtual environment 780 while motion data of the subject 706a is also streamed into the virtual environment 780. In an example, all subjects of motion capture system (e.g., motion capture systems 702a, 702b) can view (e.g., using head-mounted displays) motion of digital bodies of other subjects within a virtual environment. In some cases, displays allowing a subject to view a virtual environment into which their motion data is also streamed can facilitate collaboration between subject at different locations. In an example, actors at a first motion capture location can collaborate with actors at another motion capture system to capture motion data for animated films, using displays (e.g., head mounted displays) to allow a virtual environment to be visible to each actor. In another example, a virtual environment can be a video game (e.g., a sports video game, a combat video game, a racing video game), with players at different motion capture locations. The players in the video game can view the video game using head-mounted displays while their motion is also captured and streamed into the video game and can interact with digital bodies corresponding to others players at other motion capture locations.

In some examples, systems for providing an immersive digital experience can perform balancing of position data received. For example, more or fewer positional coordinates can be received or streamed to a given system based on constraints, which can include a required rendering quality, networking constraint, a number of digital bodies in a virtual environment, etc. In some cases, a computer system (e.g., any or all of dedicated server 716, on-site game engine servers 710, 710b, or client device 718) can determine a number of position coordinates to stream based on a number of digital bodies in a virtual environment. For example, network and computational constraints can limit a system's capacity to process positional coordinates while retaining a minimum rendering quality for a virtual environment. In an example, a system may only have the capacity to process 60 position coordinates at a given time. When a single digital body (e.g., digital body 782) is streamed into the virtual environment (e.g., into the dedicated server 716), the virtual environment can use 60 positional coordinates of the single digital body to render the digital body in the virtual environment. When the environment includes an additional two digital bodies (e.g., digital bodies 784, 785), the number of position coordinates processed for each body can be 20 position coordinates, and resolution of the rendering can be reduced to accommodate additional digital bodies. In some applications, some digital bodies can receive greater priority than other digital bodies. For example, a virtual environment can be a surgical simulation which can require a high degree of resolution for a digital body corresponding to a patient and portions of a digital body corresponding to a surgeon performing the simulated surgery but require less resolution for an observer in the virtual environment. Thus, if a constraint is reached (e.g., a virtual environment includes the maximum number of positional coordinates) a process on a server implementing the virtual environment (e.g., the dedicated server 716) can reduce a total resolution of lower priority digital bodies to maintain a resolution of higher-priority digital bodies.

In some cases, a priority of a digital body can be determined by an administrator of a virtual environment, by a user of a virtual environment, or the priority can be set in a setting of the virtual environment. For example, in some cases, a virtual environment can prioritize motion data streamed from particular computer systems over motion data streamed from other computer systems (e.g., motion data from on-site game engine server 710a can be prioritized over motion data from the on-site game engine server 710b illustrated in FIG. 7). In some examples, a user can select digital bodies or objects in a virtual environment to be prioritized as described above. For example, a user in a virtual environment can focus on one or more bodies in the virtual environment (e.g., the user 786 can view the digital body 784 in the virtual environment 780 as shown in FIG. 7), and the digital body viewed by the user can be prioritized for resolution over other digital bodies in the virtual environment. A resolution of the digital body in the field of view of the user can be maintained or increased when the user views the digital body, and the resolution of other bodies in a periphery of the user's view or outside the user's view can be reduced (e.g., a number of streamed position coordinates for the digital bodies outside the user's field of view can be reduced) if an amount of motion data streamed into the virtual environment exceeds a networking or computing constraint, as described above (e.g., systems and methods of the present disclosure can implement foveated rendering techniques).

Figure 8B:
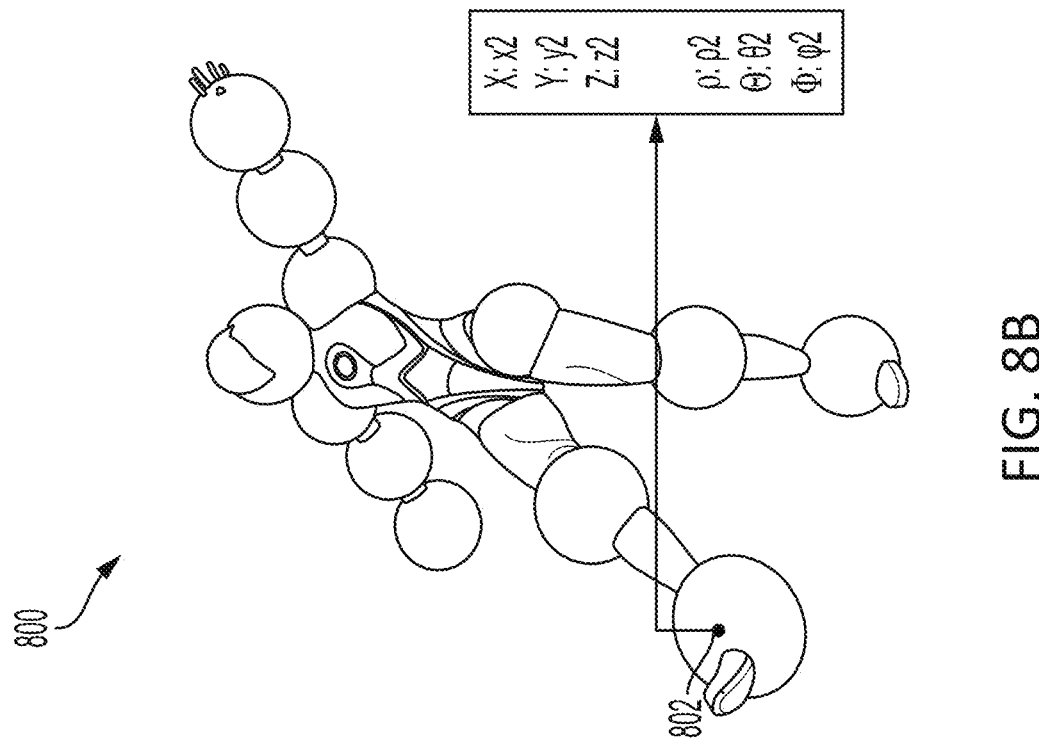
FIGS. 8A-8B are perspective views of skeletal meshes used to provide streamed immersive digital experience, according to some embodiments.
Figure 8A:
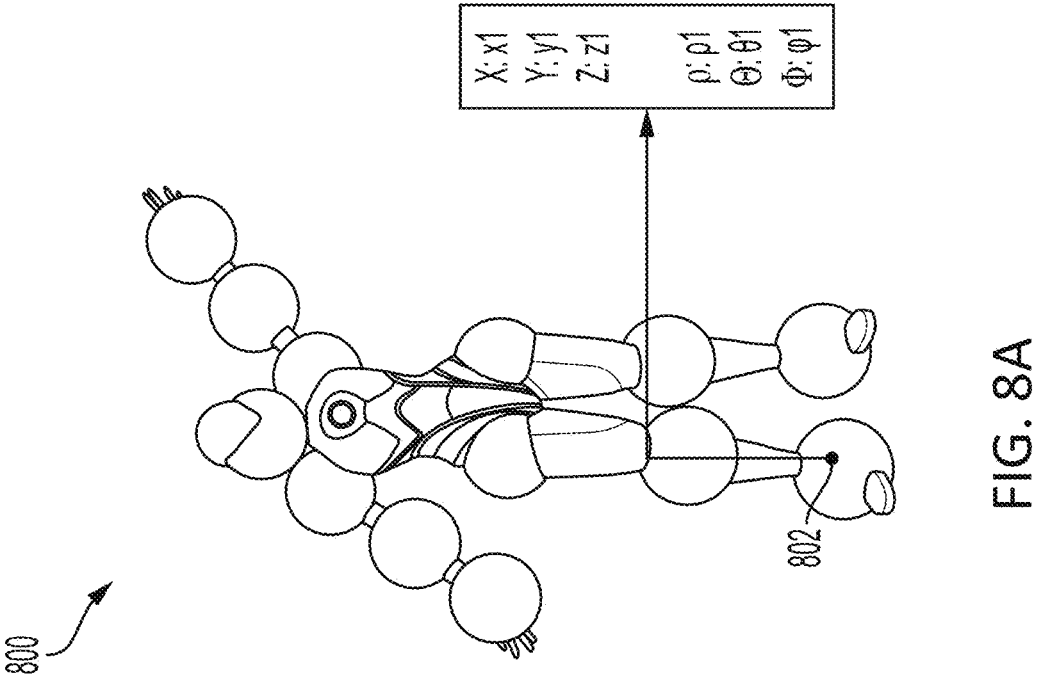

FIGS. 8A and 8B illustrate an example skeletal mesh 800 (e.g., a skeletal mesh for a football player). The skeletal mesh 800 is shown in a first position in FIG. 8A, corresponding to a first pose of a subject. In the first position, as shown, a point 802 is associated with first position coordinates for a foot of the subject, corresponding to a foot of the skeletal mesh. In the first position, the point 802 include a first measurements for values of x, y, z, ρ, θ and φ, as described above (e.g., x1, y1, z1, ρ1, θ1 and φ1). FIG. 8B illustrates the skeletal mesh 800 in a second position corresponding to a second pose of the subject. In the second position, as illustrated, the foot of the skeletal mesh 800 is displaced relative to the position of the hand in FIG. 8A. Therefore, the coordinates of the point 802 are changed relative to the coordinates of the point 802 in FIG. 8A (e.g., x, y, z, ρ, θ and φ have values of x2, y2, z2, ρ2, θ2 and φ2 respectively). In some embodiments, the coordinates include only the positional values x, y, z and not the rotational coordinates ρ, θ and φ.

Figure 9:
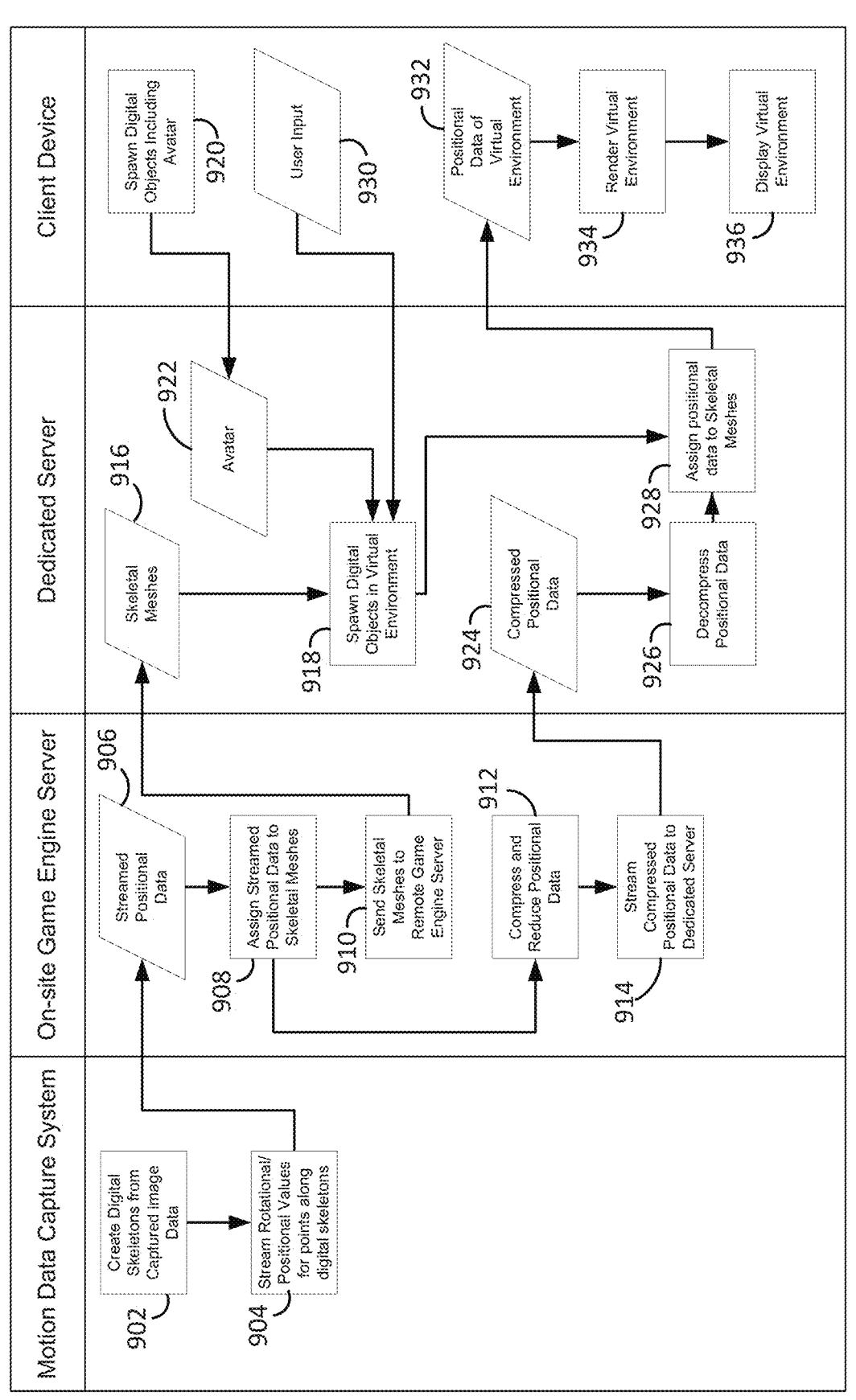
FIG. 9 is a flowchart illustrating a process for streaming positional data, with interactions between component parts of the system shown.

FIG. 9 shows a swim lane flowchart illustrating the functions of each of the motion data capture system, the on-site game engine server, the remote game engine server, and the client device. The process in FIG. 9 mirrors the processes and systems described in FIGS. 1-6.

At block 902, the motion data capture system can process image data (e.g., visual data from a camera) and create a digital skeleton for a subject based on the image data. Creating the skeleton can include determining positional data values and/or rotational data values for points along a body of the subject. In some embodiments, creating the skeletons from captured image data at block 902 can include the techniques for capturing motion data of a subject (e.g., subject 106) described with respect to motion data capture system 102 in FIG. 1.

At block 904, the motion data capture system can stream positional and/or rotational values for points along the skeletons created digital skeletons. The points can be represented by coordinates, as discussed above with respect to points 108 shown in FIG. 1. Further positional and/or rotational values for points along a digital skeleton can include scaling data, or other data which can be relevant to producing a virtual environment based in part on the streamed values.

At block 906, the on-site game engine server can receive the streamed positional data from the motion data capture system (e.g., the positional and/or rotational values streamed at block 904).

At block 908, the streamed positional data can be assigned to skeletal meshes. Assigning the positional data to skeletal meshes can include performing any or all of the techniques described with respect to block 404 of process 400 shown in FIG. 4. Assigning the positional and/or rotational values to the skeletal meshes can enable a digital object based on the skeletal mesh to move in accordance with movements of the subject for which the streamed positional data was captured.

At block 910, the on-site game engine server can send the skeletal meshes to a designated server, which can host a game hosting platform (e.g., dedicated server 116 hosting game hosting platform 118 shown in FIG. 1). In some embodiments, as noted above with respect to block 408, skeletal meshes are not sent from the on-site game engine server to the dedicated server. In some embodiment, information is provided to the dedicated server which can facilitate selection of digital meshes from a memory of the dedicated server, or from a memory of a client device, based on the streamed positional data.

At block 912, the on-site game engine server can compress and reduce the streamed positional data received from the motion data capture system. Compression and reduction of the positional data can include lossy and/or lossless compression techniques, as described above. In some embodiments, compressing and reducing the streamed positional data can be similar or identical to the compressing and/or reducing described with respect to block 410 of process 400 shown in FIG. 4.

At block 914, the on-site game engine server can stream the compressed (e.g., the compressed and reduced) positional data to a dedicated server (e.g., dedicated server 116). In some embodiments, the compressed positional data can be streamed directly to a client device (e.g., client device 120 shown in FIG. 1). Streaming the compressed data to the dedicated server can include performing any or all of the techniques describe with respect to block 412 of process 400 shown in FIG. 4.

At block 916, the dedicated server can receive the skeletal meshes provided by the on-site game engine server at block 910. In some embodiments, upon receiving the skeletal meshes, the skeletal meshes can be stored in a memory of the dedicated server (e.g., memory 226 shown in FIG. 2). In some embodiments, the skeletal meshes are stored on the memory of the dedicated server, and the on-site game engine server can provide identification of the skeletal mesh to be used or given positional data.

At block 920, a client device (e.g., client device 120 illustrated in FIG. 1) can provide an input to the dedicated server to spawn digital objects to the virtual environment. The digital objects can include an avatar of the user. In some embodiments, at block 920, the client device can perform any or all of the techniques described with respect to block 604 of process 600 shown in FIG. 6.

At block 922, the dedicated server can receive from the client device digital objects to be spawned into the virtual environment. The digital objects received from the client device can include an avatar of the user, and the avatar can be stored in the memory of the dedicated server.

At block 918, digital objects can be spawned into the virtual environment, which can include positioning the digital objects within the virtual environment. As shown, the digital objects spawned can be the skeletal meshes obtained from the on-site game engine server at block 916, and the avatar received from the client device at block 922. Spawning the digital objects can include performing any or all of the techniques described with respect to block 510 shown in FIG. 5.

At block 924, the dedicated server can receive the compressed positional data streamed by on-site game engine server at block 914. The compressed positional data can be decompressed at block 926, using decompression techniques corresponding to lossy and/or lossless compression techniques used to compress the positional data. In some embodiments, decompressing the positional data at block 926 can include performing similar or identical techniques as performed at block 514 of process 500 shown in FIG. 5.

At block 928, the dedicated server can assign the positional data to the skeletal meshes received from the on-site game engine server at block 916. Assigning the positional data to the skeletal meshes can produce movement of the skeletal meshes in the virtual environment that can correspond to movement of the subject for which the positional data is captured in the physical environment.

At block 932, the client device can receive, from dedicated server, positional data of the virtual environment. The positional data can include positional data of the digital objects including the skeletal meshes associated with the positional data captured for the subject.

At block 934, the client device can render the virtual environment. Rendering the virtual environment can include performing any or all of the techniques described at block 608 of process 600 shown in FIG. 6.

At block 934, the client device can display the virtual environment to the user. Displaying the virtual environment can include performing any or all of the techniques described at block 610 of process 600 shown in FIG. 6.

At block 930, a user can provide input to the client device. In some embodiments, the input can include a head position of the user, which can be provided by a headset worn by the user. In some embodiments, the input is an input provided through a keyboard, a mouse, or any other input into the client device (e.g., through input(s) 232 shown in FIG. 2). The input can correspond to movement of a virtual camera of the user or avatar of the user within the virtual environment. The input can be provided to the dedicated server and can be used to update a position of the user within the virtual environment. In some embodiments, receiving the user input can include performing the techniques described with respect to block 520 of process 500 shown in FIG. 5.

In testing, the methods and processes described herein allowed for a reduction in data streamed per frame from 730 bytes per frame, to 40 bits per frame. In another example, motion data for a bipedal body was reduced from 4116 bytes per frame, to 624 bytes per frame. Additionally, motion data for each joint of the bipedal body was reduced to 24 bytes. In some cases, conventional motion capture technologies can require an editing process between the capture of motion data, and the display or presentation of the data (e.g., in an animated video, a video game, a simulation, etc.). Some motion capture systems identify high-contrast areas in frames of captured video, and map those high-contrast areas to portions of a subject's body. For example, reflective markers can be positioned at various known points of the subject's body, and the motion capture system can map those reflective markers to a digital skeleton to approximate motion of the subject. In some cases, a reflective element or high-contrast portion of the data being captured can be misidentified by a motion capture system as a marker. For example, a subject whose motion is being captured can wear shoes with reflective elements, and the motion capture system can incorrectly identify the reflective element as a reflective marker (e.g., a reflective marker placed on a calf of the subject). When a reflective or high-contrast element is identified as a marker, the resulting motion of the digital skeleton, and consequently the mesh or digital objects (e.g., digital characters) can inaccurately reflect the motion of the subject. In some cases, for example, the misidentification of a reflective element as a marker can result in a limb or other portion of a corresponding digital skeleton "popping" or performing sudden movements that are not physically possible for the subject. In some cases, a view of the reflective marker can be lost from the frame, and this can cause misidentification of other high-contrast areas or reflective elements along the subject to be labeled or identified with the portion of the subject associated with the reflective marker. For these and other reasons, coordinates from motion capture systems can include inaccurate representations of the subject's motion, including inaccuracies that can cause distortion in the movements of a corresponding digital skeleton (e.g., popping, "monkey-butt", etc.).

In some cases, an editing process is required to correct inaccuracies in positional coordinate captured from a subject. For example, in production of animated movies, editors can be employed to confirm or correct three-dimensional positional data for a subject in frames of the animated movie to ensure realistic movement of characters in the movie. This process can incur significant cost in the process of preparing animation based on motion capture (e.g., for animated movies, video games, simulations, etc.). Further, this method can be disadvantageous for motion data streamed in real-time, as an individual (e.g., an editor) may not practically correct inaccurate position coordinates in real-time. Thus, coordinates that are streamed in real-time can include inaccuracies that can degrade an experience of using a real-time immersive digital experience using the streamed positional coordinates.

In some embodiments, mechanisms described herein can provide improved systems and methods for streaming motion data of dynamic subjects and provide dynamic correction of streamed positional coordinates for use in real-time digital immersive experiences or other digital experiences (e.g., video games, animated videos, simulations, etc.). In some cases, a system can include solvers (e.g., software solvers) to identify inaccuracies, and provide improved positional coordinates for streamed positional coordinates identified as inaccuracies. Solvers, according to some embodiments, can be implemented by one or more computing systems that receive positional coordinates. For example, solvers can be implemented on one or more of servers 110, 116, and the device 120 illustrated in FIG. 1, servers 710a, 710b, 716, and the client device 718 illustrated in FIG. 7, or any other computing device or system that receives streamed position coordinates. For example, with reference to FIGS. 1-3, a system for generating corrected positional data based on solvers, referred to herein as a "dynamic correction system," can be implemented on the on-site server 110. The on-site server 110 can receive positional coordinates from the motion capture system 102 and can generate corrected positional coordinates based on the positional coordinates received from the motion capture system 102, according to the processes described herein. The on-site server 110 can stream the corrected positional coordinates (e.g., positional coordinates including corrected positional coordinates generated by the dynamic correction system) to the remote game engine server 116 from the server 110 (e.g., for consumption by the game hosting platform 118 rendering motion data including the corrected positional coordinates into a virtual environment). In some cases, a dynamic correction system can additionally or alternatively be implemented on the remote game engine server 116. For example, the remote game engine server 116 can receive streamed motion data including positional coordinates (e.g., from the on-site server 110) and can implement a dynamic correction system to generate corrected positional coordinates based on the received motion data. The corrected positional coordinates generated at the remote game engine server 116 can be provided to the game hosting platform 118 and used by the game hosting engine 118 to dictate motion of a corresponding digital body within a virtual environment. In some cases, it can be useful to operate a dynamic correction system on a computing system hosting a virtual environment, as this can ensure a consistency of motion data streamed into the virtual environment. For example, if motion data (e.g., positional coordinates) is received from multiple sources, a dynamic correction system can be used to generate corrected positional coordinates associated with digital skeletons from each source, so that motion is not represented differently within a virtual environment based on the source of the positional data. For example, with reference to FIG. 7, a dynamic correction system can be implemented on dedicated server 716 and can be used to perform correction on motion data received from both of on-site game engine servers 710a, 710b. In an example, motion data from onsite game engine server 710a can differ from motion data received from on-site game engine server 710b (e.g., motion data from server 710a can include more positional coordinate per digital skeleton than motion data from server 710b, an interruption in connection with one of the servers 710a, 710b can result in a loss of positional coordinates for that server at a given time, the motion capture systems 702a can differ in quality of motion capture, etc.). The dedicated server 716 can use the dynamic correction system to generate corrected positional coordinates based on received motion data for each of subjects 706a, 706b, and 707, and the motion of digital bodies 782, 784, 785 in the virtual environment 780 can be dictated by the corrected positional coordinates. In other embodiments, dynamic correction systems can be performed by other computing systems, including for example, a dedicated dynamic correction server that receives positional coordinates from an on-site game engine server (e.g., servers 110, 710a, 710b) and streams corrected positional coordinates to downstream game engine servers (e.g., server 116, 716).

In some cases, movement of a portion of a digital skeleton associated with a positional coordinate can be constrained within a range of possible motions. For example, markers can have fixed spatial relationships with other markers, as, for example, when markers are positioned along the same bone. A dynamic correction system can evaluate the positions of the markers, and if a distance between the markers is greater or less than the known spatial relationship between the markers, the dynamic correction system can calculate a corrected position for one or both of the markers and can update the coordinates for that marker to include the corrected position. As discussed above, the dynamic correction system can be implemented on any or all of the servers 110, 116, 710, 716 illustrated in FIGS. 1-3 and 7. Dynamic correction of coordinates can also be performed based on known dynamics of a subject, and physics-based models. For example, a dynamic correction system can compare a coordinate of a point along a digital skeleton with a range of possible positions for that point, and, if the point falls outside the range of possible positions, the dynamic correction system can calculate a coordinate for the point and update the positional coordinates. The corrected coordinates for the point can be based on a known velocity of the point or other points along the digital skeleton.

In some cases, inverse kinematics (IK) algorithms can be used by a solver of a dynamic correction system (e.g., any of the dynamic correction systems described herein) to calculate corrected coordinates for points along a digital skeleton, based at least in part on a relationship with other portions of the digital skeleton. IK algorithms can calculate a position for a desired point along a digital skeleton (e.g., a joint, or a point along a bone) by solving for position of part of the digital skeleton along a kinematic chain (e.g., a series of joints and bones). In some examples, a cyclic coordinate descent inverse kinematic (CCDIK) algorithm or a forward and backward reaching inverse kinematic (FAB-RIK) algorithm, can be used for determining a corrected or predicted position for a point along a digital skeleton. Dynamic correction systems (e.g., dynamic correction systems including IK solvers) can thus use IK algorithms to perform dynamic correction for streamed positional coordinates, which can improve a quality of an immersive digital experience and can allow real-time position streaming for applications and use cases requiring greater precision or accuracy than may be provided by some conventional position streaming systems.

FIG. 10 illustrates a two-dimensional example of a dynamic correction technique or algorithm, according to some embodiments. The dynamic correction technique or algorithm may be executed by the aforementioned dynamic correction system. In the illustrated example, a digital skeleton 1002 is shown, the position of the parts of the digital skeleton 1002 (e.g., the joints and bones) are obtained from positional coordinates received from a motion capture system (e.g., motion capture system 102 shown in FIG. 1). Three frames 1000a, 1000b, 1000c are shown in FIG. 10, with frame 1000a corresponding to a first point in time, frame 1000*b* corresponding to a second point in time after the first point in time, and frame 1000*c* corresponding to a third point in time after the second point in time. The position of the digital skeleton 1002 in each of the frames 1000*a*, 1000*b*, 1000*c* corresponds to positional coordinates received from the motion capture system at the point in time corresponding to the respective frames 1000*a*, 1000*b*, 1000*c*. For example, an "elbow" joint 1007 is shown in each of frames 1000*a*, 1000*b*, 1000*c* and remains stationary in each frame 1000*a*, 1000*b*, 1000*c*, while distal point 1004 (e.g., a hand of the digital skeleton 1002) changes position from frame 1000*a* to frame 1000*b*, and from frame 1000*b* to frame 1000*c*.

When a positional coordinate of a point along a digital skeleton conforms to physics-based rules (e.g., the point is within a spatial range considered "possible" based on known dimensions of portions of the digital skeleton, degrees of freedom of movement and rotation of portions of the digital skeleton relative to other portions of the skeleton, known velocity, acceleration, or other kinematic parameters of one or more portions of the digital skeleton, etc.), dynamic correction may not be used to solve for the position of that point, and the positional coordinates of the point can remain unchanged. For example, FIG. 10 illustrates a spatial envelope 1006*a* constraining possible movement of the distal point 1004 between frames. In the illustrated example, the distal point 1004 can rotate about the elbow joint 1007 in either a clockwise or counterclockwise direction between the illustrated boundaries constraining the angular motion. In some embodiments, spatial constraints can be provided for multiple degrees of freedom, and can allow linear translation of a point within a range, rotation about multiple axes, etc. In some cases, a spatial envelope can include limits of possible motion in three dimensions. In some cases, a spatial envelope can be calculated based on possible motion of multiple points along a kinematic chain (e.g., a spatial envelope for distal point 1004 can be calculated to accommodate possible motion of the elbow joint 1007 in addition to possible motion of the distal point 1004 relative to the elbow joint 1007).

As further shown in FIG. 10, at the second point in time shown in frame 1000*b* the distal point 1004 is displaced relative to the position of the distal point 1004 in frame 1000*a*. The position of the points along the digital skeleton 1002, including the elbow joint 1007 and the distal point 1004 can correspond to position coordinates received from a motion capture system for movement of a subject. As shown, the position of the distal point 1004 can be within the spatial envelope 1006*a* (e.g., within a range of possible positions of the distal point 1004 considering the kinematics of the digital skeleton 1002, previous position of the point 1004, movements of other portions of the digital skeleton 1002 in the kinematic chain, time between the frames 1000*a* and 1000*b*, etc.). In some cases, if the position of a point along a digital skeleton (e.g., the distal point 1004) is within a previously calculated spatial envelope (e.g., within a range of possible positions for the point), the dynamic correction system implementing the dynamic correction technique can accept the position coordinates for the point. As shown, no correction is performed for the position of the distal point 1004, as the distal point 1004 is within the spatial envelope 1006*a*. In some cases, spatial envelopes or other position constraints (e.g., ranges of possible positions for all or portions of a digital skeleton 1002) can be determined every point in time for which motion capture is performed, to constrain position coordinates received at a subsequent point in time. In some cases, spatial envelopes can be determined to constrain a movement of all or a portion of a digital envelope for a plurality of subsequent frames. For example, a spatial envelope calculated relative to a first position of a portion of a digital skeleton can be determined to include all possible movements of the portion of the digital skeleton within one second of motion (e.g., within the number of frames of positional coordinates captured in one second). In some cases, a spatial envelope can be determined to constrain the motion of all or a portion of a digital skeleton within any number of frames or any time period for which motion is captured. In some cases, the number of frames or time period for which to set a constraint (e.g., a spatial envelope) for movement of all or a portion of a digital skeleton can be configurable by a user. In the illustrated embodiment, a spatial envelope 1006*b* is determined, constraining a range of possible positions of distal point 1004 within a period of time from the second point in time.

In some examples, the dynamic correction system can determine if coordinates provided from a motion capture system correspond to a digital skeleton or object for which motion is captured. For example, where reflective markers are used by a motion capture system, a high contrast element (e.g., a reflective element) can be identified by the motion capture system as a marker, and the motion capture system can stream a positional coordinate for the high-contrast element with the position coordinates for the body of the subject. As further illustrated in FIG. 10, frame 1000*b* includes a point 1008 that corresponds to a position coordinate streamed from the motion capture system corresponding to the frame 1000*b*. In some cases, the dynamic correction system can determine that the point 1008 is not associated with any of the known position markers for which motion is being captured and can determine that point 1008 is not associated with the digital skeleton 1002. For example, an IK algorithm can check the position of point 1008 against possible positions of other points of the digital skeleton 1002. If the point 1008 falls outside a possible position for all of the points along the digital skeleton 1002, the IK algorithm can determine the location of the point 1008 to be incorrect. The IK algorithm can further determine if a full set of points for the digital skeleton 1002 are accounted for (e.g., present in the frame 1000*b*), and if so, the point 1008 can be determined to be an extraneous point, rather than a mislocated point along the digital skeleton 1002. In some cases, the dynamic correction system can correct the frame 1000*b* by removing the positional coordinates for point 1008, and downstream computing systems displaying movement of digital meshes based on the digital skeleton will not include movement corresponding to the point 1008. In some examples, the motion capture data (e.g., positional coordinates) received by a computing system implementing a dynamic correction system can include only points associated with a digital skeleton (e.g., digital skeleton 1002). For example, some motion capture systems may assign identified points to a known digital skeleton before streaming to a downstream system (e.g., a computing system implementing the dynamic correction system) and thus, incorrectly identified points can be streamed to the downstream system as a point along the digital skeleton (e.g., associated with a joint or a bone of the digital skeleton 1002), rather than an extraneous position coordinate.

In some examples, when the dynamic correction system determines that a position coordinate corresponding to a known point along a digital skeleton (e.g., a joint or a bone) is outside a range of possible positions for the point, the dynamic correction system can calculate or determine a position coordinate for the known point that is within the range of possible positions for the point, and can correct the position coordinates for the point (e.g., replace the previous position coordinates) with the updated position coordinate. In some cases, updated position coordinates can be determined based on known previous positions or velocities of the point. For example, frame 1000c illustrates a point 1010 that is outside of the spatial envelope 1006b. The point 1010 can correspond to a position coordinate streamed from a motion capture system for a hand of a subject (e.g., similar to distal point 1004). Because the point 1010 is outside of the spatial envelope 1006, the dynamic correction system can calculate a corrected position coordinate for the distal point 1004, which, as illustrated in frame 1000c, is within the spatial envelope 1006b. The corrected position coordinate can be partially based on a known velocity of the distal point 1004 from previous frames. For example, in frame 1000b, the distal point 1004 is angularly displaced in a clockwise direction relative to the position of the distal point 1004 in frame 1000a, and the dynamic correction system can calculate a position coordinate for the distal point 1004 in frame 1000c that is further displaced in a clockwise direction relative to the position of distal point 1004 in frame 1000b. In some cases, as described above, the dynamic correction system can calculate the corrected positional coordinates of a point along a digital skeleton (e.g., digital skeleton 1002) using one or more inverse kinematics algorithms (e.g., CCDIK, FABRIK, etc.). In some cases, streamed position coordinates can include gaps, as when, for example, network connection is lost, and all or a portion of position coordinates are omitted in one or more frames. Dynamic correction systems can be used, in a similar manner as described above, to calculate missing position coordinates for all or a portion of a digital skeleton for a given frame (e.g., at a particular point in time).

In some examples, an immersive digital environment can receive motion data (e.g., positional coordinates) from multiple sources, as shown and described, for example, with respect to FIG. 7. Dynamic correction systems can be used to correct position coordinates for any or all of the position coordinates streamed into a digital environment. For example, with reference to FIG. 7, the position coordinates of each of digital bodies 782, 784, and 785 can comprise coordinates determined by a dynamic correction system, which can be implemented on any or all of the on-site game engine servers 710a, 710b, the dedicated server 716, the client device 718, or any other device receiving position coordinates. Further, position coordinates can be generated for a user in an immersive digital environment, and digital skeletons can be calculated for the user to approximate motion of the user within the digital environment. For example, motion data can be captured for the user 786 and can be provided to the dedicated server 716 to allow the movements of the user 786 to be replicated in the virtual environment 780. In some cases, the user 786 may be wearing a head-mounted display (HMD) (e.g., client device 120 shown in FIG. 1), and the HMD can capture motion data of the user through motion sensors (e.g., accelerometers, gyroscopes, cameras, infrared sensors, etc.). In some cases, position coordinates can be generated corresponding to portions of the user's body to produce a digital skeleton corresponding to the user. Artificial intelligence models can be used to generate the position coordinates of the user based on the sensed motion of the user from the HMD or any other motion capture devices in use by the user. Dynamic correction systems as described above can be used to analyze the position coordinates of a user and perform correction or predict coordinates, as described above to provide an improved experience of the user motion within the digital environment (e.g., the virtual environment 780).

Figure 11:
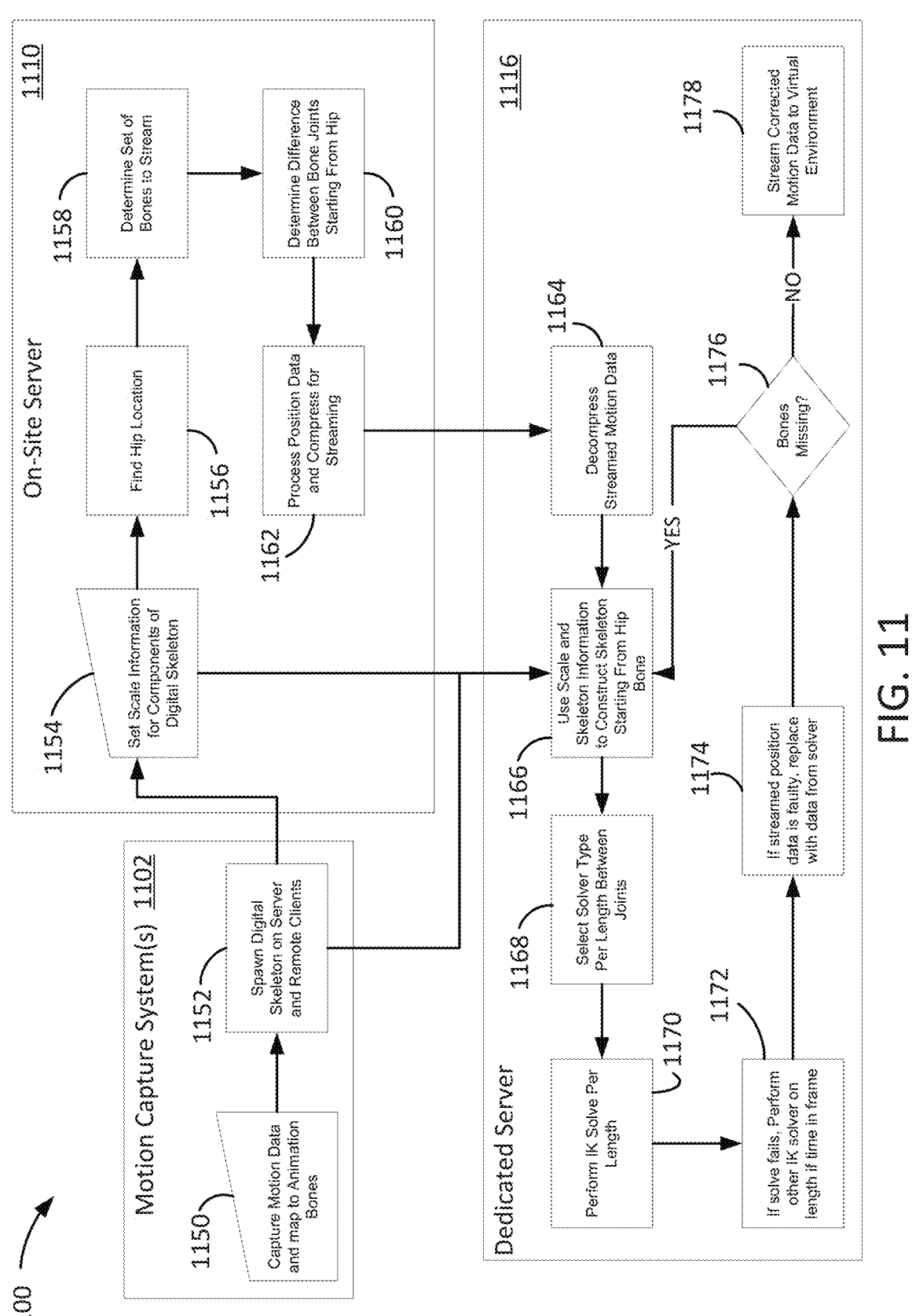
FIG. 11 is a diagram illustrating a system and process that can be used to implement dynamic correction on positional data for digital skeletons.

FIG. 11 illustrates an example system and process 1100 for streaming motion data (e.g., position coordinates of one or more digital skeletons), the streaming including implementing a dynamic correction system (e.g., similar or identical to a dynamic correction system capable of producing the output shown in FIG. 10). The system portion of the system and process 1100 can be similar to the systems 100, 700, and can include similar numbering (plus 1000) for similar components. For example, the system portion of the system and process 1100 includes a motion capture system 1102, which can be similar or identical to motion capture system 102, an on-site server 1110, which can be similar or identical to on-site server 110, and a dedicated server 1116 which can be similar or identical to the dedicated server 116. The process portion of the system and process 1100 may include the functional blocks 1150-1178 illustrated in FIG. 11. The particular distribution of functional blocks among the system components in FIG. 11 (motion capture system 1102, on-site server 1110, and dedicated server 1116) is one example distribution; in other examples, one or more of the functional blocks illustrated in one system components are implemented by other system components of FIG. 11. For example, one or more of the functional blocks 1164-1178 may be implemented by the on-site server 1110, or one or more of the functional blocks 1154-1162 may be implemented by the dedicated server. In some examples, the functional blocks 1150-1178 are implemented by another system. Further, although blocks 1150-1178 are illustrated as discrete blocks performed in a particular sequence, in some examples, one or more of the functional blocks 1150-1178 are executed in parallel, or partially in parallel, with another of the one or more functional blocks 1150-1178, and/or one or more of the functional blocks 1150-1178 are bypassed. Additionally, in at least some examples, each functional block corresponds to one or more electronic hardware components of the corresponding system component (in which the functional block resides) capable of implementing the functional block, and/or software stored in and/or executed by one or more electronic hardware components (in which the functional block resides) capable of implementing the functional block. Such hardware components may include, for example, one or more of a processor (e.g., similar to the processor 202, 210, 220, or 230), a memory (e.g., similar to the memory 204, 216, 226, or 236), an input (e.g., similar to the input(s) 212, 222, 232), and/or a communication system (e.g., similar to the communication system 208, 214, 224, 234).

As shown, the motion capture system 1102 can capture motion data of one or more subjects and map the motion data to a digital skeleton at block 1150. The motion data can include positional coordinate, rotational coordinates and other data associated with the motion of points along a subject's body (e.g., at locations corresponding to bones, joints, or sections of a subject), and the motion capture system 1102 can obtain the motion data using any known motion capture apparatuses (e.g., a light-based motion capture system, a motion capture system using inertial sensors to detect motion, a HMD or other wearable device capturing or generating motion data for a subject, using machine vision to identify points along a subject, etc.). Further, at block 1150, the process can map the motion data to animation bones. For example, individual position coordinates can be designated (e.g., labeled, either automatically or with human input) as belonging to a particular digital skeleton, and can further be associated with particular bones or joints of a digital skeleton for the digital body. The digital skeleton can include spatial relationships between portions of a subject's body. For example, the skeleton can define a joint hierarchy of a digital body, and lengths of bones (e.g., lengths between joints). For example, a digital skeleton can include a length of a forearm and a calf, and a ratio of the length of the forearm to the calf can be enforced throughout movement of the digital skeleton. In some cases, the digital skeleton can be used to constrain motion of one bone relative to adjacent bones or adjacent joints of the digital skeleton according to known physical models. In some cases, the motion capture system 1102 can perform capture of motion data and mapping to a digital skeleton as described with respect to the motion capture system 102.

The motion capture system 1102 can further spawn the digital skeleton to one or more local clients (e.g., on-site server 1110) or remote clients (e.g., dedicated server 1116) at block 1152. Spawning the digital skeleton can include sending the digital skeleton to a downstream device, for use by the downstream device in mapping and interpreting corresponding motion data. The digital skeleton can be sent via a "push," with the motion capture system broadcasting the digital skeleton to one or more devices or can be "pulled" from the motion capture system 1102 (e.g., one or more of server 1110, 1116 can issue an API call to retrieve the digital skeleton). In some cases, the digital skeleton can be spawned to other computer systems using any or all of the techniques described with respect to blocks 312, 510, 604, and/or 918 above. As noted above, in some cases, the digital skeleton can be a digital skeleton preserving the dimensions or ratio of dimensions of the subject for which motion data is captured (e.g., ratios of lengths of bones of the digital skeleton can be substantially identical to ratios of lengths of bones of the subject). In some cases, the digital skeleton can have different relative dimensions from the subject. For example, the digital skeleton can be a digital skeleton corresponding to a bipedal animated mouse, and the ratios of bone lengths of the digital skeleton for the animated mouse can differ from the bone lengths of the subject (e.g., a human being). In cases where a subject's relative dimensions (e.g., ratios of bone lengths) differ from a digital skeleton to which the movements of the subject are mapped, the position coordinates for the digital skeleton can be prone to "pop", "monkey butt" or other effects that degrade a quality of animation. In other examples, a digital skeleton can be spawned (e.g., provided to a downstream device for use by the downstream device in rendering motion data) from any device having the digital skeleton in a memory. For example, in some embodiments, digital skeletons of a subject can be spawned from the on-site server 1110 to the dedicated server 1116. In some examples, additional servers can be provided including digital skeletons to be spawned.

The on-site server 1110 can receive motion data and digital skeleton data from the motion capture system and can determine scale information and desired resolution information from the digital skeleton at block 1154. For example, capturing and preserving the lengths of bones of a digital skeleton can reduce a storage required for positional coordinates, which can be reduced to unit vectors (e.g., unit quaternions). Providing the lengths (e.g., the scale information) to a downstream system can allow the downstream system to apply the lengths to received position coordinates expressed as unit vectors (e.g., normalized quaternions) so that less information is required for streaming. Further, a resolution can be selected (e.g., manually by a user or automatically by a process running on the on-site server) for scale (e.g., length) information, and can be used to determine the number of bits associated with each component. For example, a scale associated with a particular bone of a digital skeleton can comprise an integer value for applications requiring less precision, or a user can select a higher resolution (e.g., scale values having greater precision) for applications requiring greater resolution. The scale information including scales for lengths between joints and other distances in a digital skeleton can be sent (e.g., via a "push" or a "pull" operation) to the dedicated server, for use in decompressing streamed motion data of the digital skeleton. Scale can be determined for one or more bones, and position coordinates and other motion data received from the subject can be transformed to generate position coordinates for the digital skeleton.

The on-site server 1110 can proceed to determine (e.g., find) a hip bone or joint location at block 1156 in a current frame of motion data (e.g., the position of the digital skeleton and points thereof at a particular point in time). The hip bone or joint can be identified from the digital skeleton using an analysis of portions of the digital skeleton, or from a label or other designation identifying one or more points along the digital skeleton as the hip. The location of the hip bone can be used to determine the relative location of other bones and joints of the digital skeleton. In other examples, another bone or joint of the digital skeleton can be a starting bone from which the positions and orientations of other bones or joints of the digital skeleton are measured. Finding an initial bone (e.g., a bone from which to measure relative positions and orientations of other bones of a digital skeleton) can assist in reduction of data to be streamed, as streamed positional data (e.g., vectors or quaternions) can be reduced to unit vectors relative to adjacent bones or joints. It can thus be advantageous to perform block 1156 and other compression steps on the on-site server 1110 to reduce a latency in streaming of motion data to remote clients (e.g., due to a lower latency between the motion capture system 1102 and the on-site server 1110).

The on-site server 1110 can determine at block 1158 whether to stream a full set of motion data for one or more digital skeletons, or a limited (e.g., reduced set). In some cases, a full set of motion data can include all positional coordinates and orientation information associated with the digital skeleton. A reduced set can be a set of position coordinates and orientation data for conveying requisite motion for a given application but excluding some or all joint information associated with motions of the digital skeleton with lesser relevance to a particular application (e.g., removing finger joint positional coordinates for a streaming of motion data associated with a subject playing soccer). The decision to stream a limited set of motion data can be based on a network constraint between the on-site server 1110 and the dedicated server 1116, a computational constraint of either of the on-site server 1110 and the dedicated server 1116, an environmental constraint for a virtual environment (e.g., virtual environment 780 shown in FIG. 7) or other constraints. For example, a network connection between the on-site server 1110 and the dedicated server can have enough capacity to stream 100 positional coordinates within a specific time frame. If motion data of a first digital skeleton includes 100 positional coordinates or less, then, the server 1116 can determine at block 1158 to compress and stream all position coordinates associated with the first digital skeleton. If the on-site server 1116 is streaming a second digital skeleton in addition to the first digital skeleton, the combined number of position coordinates to be streamed can be greater than the maximum 100 positional coordinates, and the server 1110 can determine, for each of the first and second skeletons, which set of positional coordinates (e.g., associated with particular bones and joints) to compress and stream. Determining which positional coordinates to stream can be performed based on the requirements of a particular destination virtual environment (e.g., in some applications, motions of a particular portion of a digital skeleton can be of greater importance than motions of other portions of the digital skeleton). In some cases, certain bones and joints can be excluded based on a relative case of recalculating the excluded bone or joint (e.g., using artificial intelligence models or biomechanical models) at downstream systems (e.g., the dedicated server 1116. In some cases, when limiting a number of bones streamed, bones can be selected based on the particular virtual environment and application for the streamed motion data. For example, if the motion data corresponds to motion data of an athlete (e.g., a football player), joints related to individual fingers can be omitted, and the limited bone data can include relative positions for elbow and shoulder joints, but not wrist and finger joints. In this example, the overall positioning of the athlete's body and major appendages in a virtual environment may be more relevant or interesting to a user or viewer than the particular locations of individual fingers of the athlete. In some cases, specific joints can be important. For example, in a sports medicine context, greater resolution can be required for specific areas of a subject's body, and thus, for example, most or all joint information from a waist down can be retained, while joints corresponding to finger motion, neck motion, etc. can be omitted from the motion data to be streamed.

In some cases, a computational constraint can dictate a number of positional coordinates to stream. For example, the on-site server can have a capacity to process (e.g., perform compression) on a threshold number of positional coordinates within a first time period, and if that number is exceeded, the on-site server can select a limited number of positional coordinates (e.g., associated bones and joints) to process to bring the number of positional coordinates processed in the first time period beneath the first threshold. In some case, other constraints (e.g., including temporary capacity limitations) can prompt a decision at the on-site server 1110 to limit a number of bones and associated positional coordinates to process and stream.

In some examples, to determine a particular limited set of bones for streaming in block 1158, the on-site server 1110 may include and/or access a lookup table or database that maps particular constraints to a particular set of bones for streaming.

When the on-site server 1110 has determined a set of bones (e.g., a limited or full set of bones and associated positional and rotational coordinates) to be streamed, the on-site server can determine positional differences between end joints (e.g., positional coordinates or quaternions for an end joint of a bone) of consecutive bones at block 1160. For example, a positional difference between a knee joint and a hip bone can be determined as a quaternion (e.g., representing a positional offset of the knee joint from the hip bone, and an orientation of the bone spanning the joints). Subsequently, a positional difference between an ankle joint and the knee joint can be similarly determined. Differences can be determined up to an end joint in a particular branch of a kinematic chain (e.g., a branch of a kinematic chain extending between the hip bone and a finger extremity, or a toe extremity, or a head joint, etc.). Thus, knowledge of a position of the hip bone, and the relative positions for subsequent joints along the digital skeleton (e.g., along the kinematic chain) can facilitate reconstruction of the digital skeleton. An output of block 1160 can include a serialized list of vectors or quaternions representing a hip bone and positional differences (e.g., including orientation data) between consecutive joints along the kinematic chain of the digital skeleton. In some embodiments, the positional differences can be measured starting from any bone or joint and is not limited to the hip bone. For example, a position of an ankle joint can be determined at block 1156, and positional differences can be calculated for each joint along the kinematic chain of the digital skeleton beginning at the ankle joint.

At block 1162, the on-site server 1110 can compress the positional data output from block 1160, including the relative positional data along the kinematic chain of the digital skeleton. Compressing the data can include normalizing the positional vectors to produce unit vectors (e.g., unit quaternions). In an example, a relative position of a knee joint from a hip joint can be expressed as $(0, 0, -9.6743, 0)$ (e.g., a total length of the bone spanning the hip joint and the knee joint can be 9.6743 in a given direction, designated with a negative sign. This length can be included in the scale information provided to the dedicated server 1116 at block 1154, and the size of the relative position quaternion can be reduced by converting the quaternion to the unit quaternion $(0, 0, -1, 0)$, providing a direction and orientation for the represented bone. As shown, a number of decimal places represented in the unit quaternion (e.g., or unit vector) can be reduced relative to the calculated relative positional vector, and thus, a total storage required for the quaternion is reduced. In some cases, one or more portions of a unit vector can be derived from the other values of the unit vector, and the derivable portion can be excluded from the portion to be streamed, further reducing a size of the data to be streamed. For example, in some cases, a unit quaternion can have a unit length of 1, and can have values (W, X, Y, Z), with the values adhering to the equation $X^2+Y^2+Z^2+W^2=1$. The value for W, for example, can thus be derived from known values for X, Y, and Z, and the value for W can be omitted from streaming (with the sign of W being preserved and included in streamed data), which can further reduce a size of motion data being streamed. In some cases, the resulting compressed unit quaternions (e.g., omitting the value for W but including the sign) can be arranged in a particular order with the position of the respective compressed unit quaternions being associated with a particular bone, joint, or relationship with a prior compressed unit quaternion. In some embodiments, compressing the positional data can include setting a precision for W, X, Y, and Z values of a quaternion (e.g., the number of decimal points included, with more decimal points requiring greater storage). In some cases, the compression methods described above with respect to blocks 306, and 408 can be additionally or alternatively performed by the on-site server 1110. The compression methods and processes described here can provide significant improvements over some conventional streaming of positional data (e.g., motion data) including by reducing the space required to store information of a single bone of a digital skeleton. For example, in some conventional systems for streaming motion data, it can require 48 bytes to stream information for a single bone of a digital skeleton, but using the compression methods described here, a single bone can require only (or can be expressed with as few as) 8 bytes per frame (e.g., the compressed unit quaternion value with the sign of an omitted dimension of the compressed quaternion).

At block 1164, the dedicated server 1116 can received streamed motion data from the on-site server 1110 (e.g., the motion data output from block 1162). The dedicated server can decompress the motion data using any of the lossy or lossless decompression techniques described herein (e.g., with respect to blocks 308 and 514 of FIGS. 3 and 5 respectively). In some cases, decompressing the motion data can include recalculating dropped values of a vector or quaternion. For example, the relationship between values of a unit quaternion (i.e., $X^2+Y^2+Z^2+W^2=1$) can be used to generate the value for W from the X, Y, and Z values (i.e., to generate a complete unit quaternion from the compressed unit quaternion), and the sign for W included in the streamed motion data can be assigned to the calculated W value. In some cases, decompressing can include using artificial intelligence models or biomechanical models to derive the positions of joints excluded from the position data (e.g., positional coordinates excluded from the motion data when the data is limited at block 1158).

The dedicated server 1116 can construct the digital skeleton at block 1166 using the unit quaternion values (e.g., the relative positional values) decompressed at block 1164, as well as know other known information of the digital skeleton, including, for example, the scale values provided to the dedicated server 1116 at block 1154 (e.g., from the on-site server 1110). For example, the dedicated server can start at the known position of the hip bone and generate a position of a consecutive joint (e.g., a knee joint) by multiplying a unit quaternion by an associated scale value to obtain the length and orientation of a bone spanning the hip bone and the consecutive joint. This can be repeated for each subsequent joint along the kinematic chain for the digital skeleton (e.g., as provided in the spawned digital skeleton from block 1152) until the position for each joint and bone represented in the streamed motion data has been determined. In some cases, if the selected precision at block 1154 was low, a resolution of the digital skeleton can be low, and conversely, if the scales (e.g., the lengths) were preserved at block 1154 with a higher degree of precision (e.g., a higher number of decimal points), the resolution and quality of the constructed digital skeleton can be greater.

The dedicated server 1116 can run inverse kinematic solvers based on a known digital skeleton to evaluate the digital skeleton constructed at block 1168. In some cases, a solver can be run for each length (e.g., each bone or distance between consecutive joints of the digital skeleton) to evaluate each point along the digital skeleton. In some cases, the IK solver can be one of a CCDIK solver or a FABRIK solver. In some cases, the solver can be selected based on a suitability of the solver for a particular section of skeleton being solved for, or by computational constraints associated with the respective solvers. For example, the dedicated server 1116 may include and/or access a lookup table or database that maps particular sections of skeletons to particular solvers. At block 1170, the dedicated server 1116 can implement the selected IK solver to iteratively solve for position coordinates of joints of the digital skeleton, and bones extending between joints. In an example, the IK solver can produce outputs based on the process described with respect to FIG. 10. For example, the IK solver can account for known constraints and state information of the digital skeleton, including possible ranges of motion, degrees of freedom, prior position, velocity, and acceleration values for particular points along the digital skeleton, etc. In some cases, if the selected solver fails to solve for a particular length at block 1170, the process can proceed to solve for the length using the other solver (e.g., if the originally selected solver is FABRIK, the dedicated server

1116 can run the CCDIK solver for the given length), if performing the additional solve does not exceed a time threshold.

At block 1174, the dedicated server 1116 can replace positional values of the digital skeleton determined to be faulty with updated positional values generated by the solver at one of blocks 1170 or 1172. For example, with reference to FIG. 10, when the streamed position point 1010 for the hand of the digital skeleton 1002c falls outside of an acceptable range, as determined by the IK solver, the value can be replaced with the generated positional value for point 1004, as illustrated. In some case, when a positional value is corrected, values for points "downstream" of the corrected point (e.g., closer to a distal or ultimate joint) can be generated by an IK solver based on the value of the corrected point. In some cases, IK solvers at blocks 1170, 1172 can be used to solve for missing points. For example, if a connection between the dedicated server 116 and the on-site server 1110 is lost, motion data for a frame of a digital skeleton can be generated entirely from the IK solvers. In some cases, an IK solver can generate position coordinates for missing points in a digital skeleton. The output of block 1174 can be position coordinates for joints and bones of a digital skeleton at a frame of time, including corrected position coordinated if at block 1174 the dedicated server 1116 (e.g., IK solvers run on the dedicated server 1116) determine that the values received from the on-site server 1110 are incorrect.

At block 1176, the dedicated server 1116 can evaluate the positional data from block 1174 to determine if bones or joints of the digital skeleton are missing. This can include comparing the digital skeleton comprising the corrected motion data from block 1174 with the digital skeleton received from the motion capture system 1102 at block 1152. If bones of the spawned digital skeleton are not included in the digital skeleton output from block 1174, the dedicated server can reconstruct the skeleton again and implement blocks 1166-1174 to generate a digital skeleton containing further corrected positional data. In some cases, a virtual environment can only require a certain set of bones of a digital skeleton be present, and the dedicated server 1116 can check for the existence of only these bones at block 1176. If at block 1176, the digital skeleton output from block 1175 is not missing essential bones, the motion data (e.g., the frame of the digital skeleton including positional coordinated for joints and bones thereof) can be streamed into a virtual environment (e.g., virtual environment 780 illustrated in FIG. 7.). In some cases, the steps shown in FIG. 11 can be performed on any server, or device, including servers or devices additional to or alternative to the system 1102 and the server 1110 and 1116. For example, an additional server can be provided to perform all or a part of the dynamic correction system and can stream corrected position coordinates to any downstream system. In some cases, dynamic correction can be performed as a service, and a server implementing dynamic correction can receive positional coordinates from any source and perform IK solvers against streamed position coordinates to generate corrected position coordinates. In some examples, a method is provided comprising the functional blocks 1164 to 1178. In some examples, a method is provided comprising the functional blocks 1154 through 1160. In some examples, a method is providing comprising a different subset of the functional blocks 1150-1178.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

Any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

What is claimed is:

1. A method for providing an immersive digital experience, the method comprising:
    generating, at a first computing device, a virtual environment, the virtual environment including positional data for at least one digital object;
    receiving first streamed motion data, the first streamed motion data corresponding to real-time motion of a first physical subject and including a first plurality of data points, each data point of the first plurality of data points being associated with a position of a portion of the first physical subject, wherein the first streamed motion data is compressed;
    decompressing the first streamed motion data by inferring from the first plurality of data points, an inferred data point, a position of the inferred data point being calculated relative to at least one data point of the first plurality of data points;
    generating, within the virtual environment, a first skeletal mesh and positioning the first skeletal mesh at a first initial position relative to the at least one digital object;
    associating each of the first plurality of data points with a corresponding point along the skeletal mesh; and
    streaming, to a client device, positional information of the first skeletal mesh and the at least one digital object.

2. The method of claim 1, further comprising:
    receiving second streamed motion data, the second streamed motion data corresponding to motion of a second physical subject and including a second plurality of data points, each data point of the second plurality of data points being associated with a position of a portion of the second physical subject;
    generating, within the virtual environment, a second skeletal mesh and positioning the second skeletal mesh at a second initial position relative to the at least one digital object;
    associating each of the second plurality of data points with a corresponding point along the second skeletal mesh; and
    streaming, to the client device, positional information of the second skeletal mesh.

3. The method of claim 2, wherein the first streamed motion data is received from a first server, and the second streamed motion data is received from a second server.

4. The method of claim 1, further comprising:
    generating, within the virtual environment, a digital avatar, the digital avatar corresponding to a user of the virtual environment;
    receiving, from the client device, an instruction, the instruction corresponding to a movement of the digital avatar within the virtual environment;
    in response to the instruction, moving the digital avatar within the virtual environment; and
    streaming, to the client device, positional information of the digital avatar.

5. The method of claim 1, wherein the first streamed motion data includes a first positional coordinate, wherein the method further comprises:
    determining that the first positional coordinate does not correspond to a portion of the first physical subject; and
    excluding the first positional coordinate from the positional information streamed to the client device.

6. The method of claim 1, wherein the first streamed motion data includes a first positional coordinate, wherein the method further comprises:
    determining that the first positional coordinate does not correspond to a position of a corresponding portion of the first physical subject;
    generating an updated first positional coordinate corresponding to a predicted position of the corresponding portion of the first physical subject; and
    associating the updated first positional coordinate with a corresponding point along the skeletal mesh.

7. The method of claim 6, wherein determining that the first positional coordinate does not correspond to a position of a corresponding portion of the first subject includes determining that the first positional coordinate is located outside of a first range of possible positions of the corresponding portion of the first subject.

8. The method of claim 6, wherein the updated first positional coordinate is generated using an inverse kinematics algorithm.

9. The method of claim 8, wherein the inverse kinematics algorithm is one of a cyclic coordinate descent inverse kinematic (CCDIK) algorithm and a forward and backward reaching inverse kinematic (FABRIK) algorithm.

10. The method of claim 6 wherein the updated first positional coordinate is generated in real-time.

11. The method of claim 1, further comprising receiving positional data of a user within the virtual environment, wherein the first plurality of data points is determined based at least in part on the positional data of the user.

12. The method of claim 1, further comprising determining, based at least in part on a computational or networking constraint, a resolution of the first skeletal mesh, and selecting, from the first streamed motion data the first plurality of data points, the first plurality of data points including fewer data points than the first streamed motion data.

13. The method of claim 1, wherein each of the first plurality of data points includes at least a portion of a unit quaternion.

14. The method of claim 13, further comprising determining, for each of the first plurality of data points, a complete unit quaternion based on the corresponding portion of the unit quaternion.

15. The method of claim 14, wherein associating each of the first plurality of data points with a corresponding point along the skeletal mesh includes multiplying the complete unit quaternion of at least one of the first plurality of data points by a scale value associated with a dimension of the first subject.

16. The method of claim 13, wherein the first plurality of data points includes a first data point and a second data point, wherein a value of the second data point indicates a position of a second portion of the first subject relative to a position of a first portion of the first subject corresponding to the first data point.

17. A computer system comprising:

at least one memory; and at least one processor coupled to the at least one memory, the system configured to cause the at least one processor to execute instructions stored in the at least one memory to:

generate, a virtual environment, the virtual environment including positional data for at least one digital object;

receive, from a first device, first streamed motion data, the first streamed motion data corresponding to real-time motion of a first physical subject and including a first plurality of data points, each data point of the first plurality of data points being associated with a position of a portion of the first physical subject and including at least a portion of a unit quaternion;

receive, from a second device, second streamed motion data, the second streamed motion data corresponding to real-time motion of a second physical subject and including a second plurality of data points, each data point of the second plurality of data points being associated with a position of a portion of the second physical subject;

generate, within the virtual environment, a first skeletal mesh and a second skeletal mesh;

position the first skeletal mesh at a first initial position relative to the at least one digital object;

position the second skeletal mesh at a second initial position relative to the at least one digital object;

associate each of the first plurality of data points with a corresponding point along the first skeletal mesh;

associate each of the second plurality of data points with a corresponding point along the second skeletal mesh; and stream, in real time, to a client device, positional information of the first skeletal mesh, the second skeletal mesh, and the at least one digital object.

18. A non-transitory computer readable medium, the non-transitory computer readable medium comprising instructions to cause at least one processor on a computer to:

generate, a virtual environment, the virtual environment including positional data for at least one digital object;

receive, from a first device, first streamed motion data, the first streamed motion data corresponding to real-time motion of a first physical subject and including a first plurality of data points, each data point of the first plurality of data points being associated with a position of a portion of the first physical subject, wherein the first streamed motion data is compressed;

decompressing the first streamed motion data by inferring from the first plurality of data points, an inferred data point, a position of the inferred data point being calculated relative to at least one data point of the first plurality of data points;

receive, from a second device, second streamed motion data, the second streamed motion data corresponding to real-time motion of a second physical subject and including a second plurality of data points, each data point of the second plurality of data points being associated with a position of a portion of the second physical subject;

generate, within the virtual environment, a first skeletal mesh and a second skeletal mesh;

position the first skeletal mesh at a first initial position relative to the at least one digital object;

position the second skeletal mesh at a second initial position relative to the at least one digital object;

associate each of the first plurality of data points with a corresponding point along the first skeletal mesh;

associate each of the second plurality of data points with a corresponding point along the second skeletal mesh; and stream, in real time, to a client device, positional information of the first skeletal mesh, the second skeletal mesh, and the at least one digital object.

19. A method for providing an immersive digital experience, the method comprising:

generating, at a first computing device, a virtual environment, the virtual environment including positional data for at least one digital object;

receiving first streamed motion data, the first streamed motion data corresponding to real-time motion of a first physical subject, wherein the first streamed motion data includes a first positional coordinate and a first plurality of data points, each data point of the first plurality of data points being associated with a position of a portion of the first physical subject;

generating, within the virtual environment, a first skeletal mesh and positioning the first skeletal mesh at a first initial position relative to the at least one digital object;

associating each of the first plurality of data points with a corresponding point along the skeletal mesh;

determining that the first positional coordinate does not correspond to a position of a corresponding portion of the first physical subject, wherein determining that the first positional coordinate does not correspond to a position of a corresponding portion of the first subject includes determining that the first positional coordinate is located outside of a first range of possible positions of the corresponding portion of the first subject;

generating an updated first positional coordinate corresponding to a predicted position of the corresponding portion of the first physical subject; and associating the updated first positional coordinate with a corresponding point along the skeletal mesh; and streaming, to a client device, positional information of the first skeletal mesh and the at least one digital object.

20. A method for providing an immersive digital experience, the method comprising:

generating, at a first computing device, a virtual environment, the virtual environment including positional data for at least one digital object;

receiving first streamed motion data, the first streamed motion data corresponding to real-time motion of a first physical subject, wherein the first streamed motion data includes a first positional coordinate and a first plurality of data points, each data point of the first plurality of data points being associated with a position of a portion of the first physical subject;

generating, within the virtual environment, a first skeletal mesh and positioning the first skeletal mesh at a first initial position relative to the at least one digital object;

associating each of the first plurality of data points with a corresponding point along the skeletal mesh;

determining that the first positional coordinate does not correspond to a position of a corresponding portion of the first physical subject;

generating an updated first positional coordinate corresponding to a predicted position of the corresponding portion of the first physical subject, the first positional coordinate being generated using an inverse kinematics algorithm; and associating the updated first positional coordinate with a corresponding point along the skeletal mesh; and streaming, to a client device, positional information of the first skeletal mesh and the at least one digital object.

21. The method of claim 20, wherein the inverse kinematics algorithm is one of a cyclic coordinate descent inverse kinematic (CCDIK) algorithm and a forward and backward reaching inverse kinematic (FABRIK) algorithm.

22. A method for providing an immersive digital experience, the method comprising:

generating, at a first computing device, a virtual environment, the virtual environment including positional data for at least one digital object;

receiving first streamed motion data, the first streamed motion data corresponding to real-time motion of a first physical subject and including a first plurality of data points, each data point of the first plurality of data points being associated with a position of a portion of the first physical subject and including at least a portion of a unit quaternion;

generating, within the virtual environment, a first skeletal mesh and positioning the first skeletal mesh at a first initial position relative to the at least one digital object;

associating each of the first plurality of data points with a corresponding point along the skeletal mesh; and streaming, to a client device, positional information of the first skeletal mesh and the at least one digital object.

23. The method of claim 22, further comprising determining, for each of the first plurality of data points, a complete unit quaternion based on the corresponding portion of the unit quaternion.

24. The method of claim 23, wherein associating each of the first plurality of data points with a corresponding point along the skeletal mesh includes multiplying the complete unit quaternion of at least one of the first plurality of data points by a scale value associated with a dimension of the first subject.

25. The method of claim 22, wherein the first plurality of data points includes a first data point and a second data point, wherein a value of the second data point indicates a position of a second portion of the first subject relative to a position of a first portion of the first subject corresponding to the first data point.

* * * * *